(12) United States Patent
Williams et al.

(10) Patent No.: US 12,026,351 B2
(45) Date of Patent: *Jul. 2, 2024

(54) 3D MODELS FOR DISPLAYED 2D ELEMENTS

(71) Applicant: MAGIC LEAP, INC., Plantation, FL (US)

(72) Inventors: Christopher Richard Williams, Miami, FL (US); Damian Franco, Miami, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,109

(22) Filed: Apr. 7, 2023

(65) Prior Publication Data

US 2023/0244354 A1 Aug. 3, 2023

Related U.S. Application Data

(63) Continuation of application No. 17/185,362, filed on Feb. 25, 2021, now Pat. No. 11,650,709.

(Continued)

(51) Int. Cl.
*G06F 3/0481* (2022.01)
*G06F 3/04812* (2022.01)
(Continued)

(52) U.S. Cl.
CPC ...... *G06F 3/04815* (2013.01); *G06F 3/04812* (2013.01); *G06F 3/04842* (2013.01);
(Continued)

(58) Field of Classification Search
CPC ............ G06F 3/04815; G06F 3/04812; G06F 3/04842; G06F 9/451; G06T 17/00;
(Continued)

(56) References Cited

U.S. PATENT DOCUMENTS 5,745,117 A 4/1998 Masuda et al.
7,342,581 B2 3/2008 Vinberg
(Continued)

FOREIGN PATENT DOCUMENTS

EP 3617871 A * 8/2018 ............... G06F 3/16
EP 2546806 5/2019
(Continued)

OTHER PUBLICATIONS

Foreign OA for CN Patent Appln. No. 202180017474.5 dated Aug. 13, 2023.
(Continued)

*Primary Examiner* — Phenuel S Salomon
(74) *Attorney, Agent, or Firm* — Vista IP Law Group, LLP

(57) ABSTRACT

A system includes: a screen configured for wear by a user, the screen configured to display a 2-dimensional (2D) element; a processing unit coupled to the display; and a user input device configured to generate a signal in response to a user input for selecting the 2D element displayed by the screen; wherein the processing unit is configured to obtain a 3-dimensional (3D) model associated with the 2D element in response to the generated signal.

24 Claims, 13 Drawing Sheets

Related U.S. Application Data

(60) Provisional application No. 62/983,196, filed on Feb. 28, 2020.

(51) Int. Cl.
| | |
|---|---|
| *G06F 3/04815* | (2022.01) |
| *G06F 3/04842* | (2022.01) |
| *G06F 3/16* | (2006.01) |
| *G06F 9/451* | (2018.01) |
| *G06T 17/00* | (2006.01) |
| *G06T 19/00* | (2011.01) |
| *G06T 19/20* | (2011.01) |

(52) U.S. Cl.
CPC .............. *G06F 3/167* (2013.01); *G06F 9/451* (2018.02); *G06T 17/00* (2013.01); *G06T 19/006* (2013.01); *G06T 19/20* (2013.01); *G06T 2200/24* (2013.01); *G06T 2219/2004* (2013.01)

(58) Field of Classification Search
CPC ... G06T 19/006; G06T 19/20; G06T 2200/24; G06T 2219/2004
See application file for complete search history.

(56) References Cited

U.S. PATENT DOCUMENTS

| | | | | |
|---|---|---|---|---|
| 2001/0043209 | A1* | 11/2001 | Nagakura | G06T 17/10 345/619 |
| 2001/0043236 | A1* | 11/2001 | Yamamoto | G06T 19/20 715/781 |
| 2008/0297503 | A1 | 12/2008 | Dickinson et al. | |
| 2012/0113140 | A1* | 5/2012 | Hilliges | A63F 13/213 345/633 |
| 2013/0204596 | A1* | 8/2013 | Yelsey | G09G 5/02 703/6 |
| 2013/0249906 | A1 | 9/2013 | Gunderson et al. | |
| 2014/0340423 | A1* | 11/2014 | Taylor | G06T 7/00 345/633 |
| 2015/0193972 | A1* | 7/2015 | Algreatly | G06T 3/60 345/420 |
| 2016/0071320 | A1* | 3/2016 | Smith | G06T 19/006 345/633 |
| 2017/0039610 | A1* | 2/2017 | Sesti | G06T 19/20 |
| 2017/0236320 | A1* | 8/2017 | Gribetz | G06F 3/011 345/419 |
| 2021/0142564 | A1* | 5/2021 | Impas | G06F 3/04815 |
| 2021/0225038 | A1* | 7/2021 | Holzer | G06T 7/246 |

FOREIGN PATENT DOCUMENTS

| | | |
|---|---|---|
| EP | 3617871 | 3/2020 |
| WO | WO 2014/182545 | 11/2014 |

OTHER PUBLICATIONS

Extended European Search Report for EP Patent Appln. No. 21760723.3 dated Jul. 17, 2023.
Final Office Action for U.S. Appl. No. 17/185,362 dated Feb. 3, 2022.
Non-Final Office Action for U.S. Appl. No. 17/185,362 dated Jun. 9, 2022.
Non-Final Office Action for U.S. Appl. No. 17/185,362 dated Jul. 22, 2021.
Notice of Allowance for U.S. Appl. No. 17/185,362 dated Jan. 11, 2023.
Amendment Response to NFOA for U.S. Appl. No. 17/185,362 dated Sep. 9, 2022.
Amendment Response to NFOA for U.S. Appl. No. 17/185,362 dated Oct. 21, 2021.
Amendment Response to FOA for U.S. Appl. No. 17/185,362 dated Apr. 1, 2022.
PCT International Search Report and Written Opinion for International Appln. No. PCT/US2021/019653, Applicant Magic Leap, Inc., dated May 6, 2021 (18 pages).
Foreign Response for EP Patent Appln. No. 21760723.3 dated Feb. 13, 2024.
Foreign NOA for CN Patent Appln. No. 202180017474.5 dated Mar. 7, 2024.
Foreign OA for JP Patent Appln. No. 2022-551292 dated Apr. 15, 2024 (with English translation).

* cited by examiner

Appendix A - Extracting 3D models from HTML Elements

Web developers can set any HTML element like buttons, images, anchor tags, divider, etc. as extractable by simple setting a few attributes on the HTML element. With this feature users can extract 3D models from any HTML element and place it in their physical environment by pressing and holding the trigger button on the controller while the cursor is on the HTML element that was set to be extractable.

HTML Element Attributes extractable

This attribute must be set to be able to extract 3D models from any HTML element in a web page and place it in their physical environment.

`extractable="(true|false)"` extracted-src

This is the path to the 3D model to be extracted from any HTML element.

`extracted-src="(path to model)"`

HTML    JavaScript
_____

```
<!-- Extract ballon 3D model from img HTML element.-->
<!-- By default the size of the model will be 15% of the dimensions of the brower.-->
<img id="ballooning" src="/images/balloon.jpg"
extractable="true"
extracted-src="/models/balloon.glb"/>
``` extracted-size

This attribute is used to specify the dimensions of the model in meters once the model is placed in the physical space. When the extracted size is not specified, by default the size of the 3D model will be 15% of the dimensions of the browser.

`extracted-size="Width, height, breadth"`

HTML    JavaScript

FIG. 10A

```html
<!-- Extract model with width of 0.7 meters, height of 0.8 meters, and breadth of 0.7 meters. -->
<img id="balloonImg" src="/images/balloon.jpg"
extractable="true"
extracted-src="/models/balloon.glb"
extracted-size="0.7, 0.8, 0.7"/>
``` extracted-scale

As an alternative to using extracted-size, you can use the extracted-scale attribute to specify a multiplier which will scale the model once the model is placed in the physical space.

Extracted 3D models are scaled from the default size, wich is 15% of the dimensions of the browser.

extracted-scale="(number)"

HTML   JavaScript

```html
<!-- Model will be sized once extracted to be 5 time bigger than the default size. -->
<img id="balloonImg" src="/images/balloon.jpg"
extractable="true"
extracted-src="/models/balloon.glb"
extracted-scale="5" />
```

*All of the <ml-model> Attributes, Transform Animations and Model Animations could be applied to the 3D model to be extracted from the HTML element.*

```html
<!-- Extract shoe model from <a> element with specified dimensions. -->
<!-- Apply shoelace animation, rotation and color to the shoe model once extracted. -->
<a id="redShoe" extractable extracted-src="models/redShoe.glb"
model-animation="shoelace, false, 1"
extracted-size="0.25, 0.25, 0.7"
rotation="0.6, 2.3, 4"
color="red">Press and hold trigger here to extract red shoe</a>
```

FIG. 10B

3D MODELS FOR DISPLAYED 2D ELEMENTS

CROSS REFERENCE TO RELATED APPLICATIONS

The present disclosure is a continuation of pending U.S. patent application Ser. No. 17/185,362 and entitled "3D MODELS FOR DISPLAYED 2D ELEMENTS", filed Feb. 25, 2021, which further claims the benefit of priority to U.S. Provisional Patent Application Ser. No. 62/983,196 and entitled "ACCESSING 3D MODELS FOR PAGE ELEMENTS", filed Feb. 28, 2020. The entire disclosures of the aforementioned U.S. patent application and U.S. provisional patent application are hereby explicitly and fully incorporated by reference in their entireties for all purposes, as though set forth in the present disclosure in full.

FIELD OF THE DISCLOSURE

The present disclosure relates to head-worn image display devices, and methods and apparatus for allowing user to access and manipulate three-dimensional (3D) virtual objects.

BACKGROUND

Modern computing and display technologies have facilitated the development of "mixed reality" (MR) systems for so called "virtual reality" (VR) or "augmented reality" (AR) experiences, wherein digitally reproduced images or portions thereof are presented to a user in a manner wherein they seem to be, or may be perceived as, real. A VR scenario typically involves presentation of digital or virtual image information without transparency to actual real-world visual input. An AR scenario may involve presentation of digital or virtual image information as an augmentation to visualization of the real world around the user (i.e., transparency to real-world visual input). Accordingly, AR scenarios involve presentation of digital or virtual image information with transparency to the real-world visual input.

MR systems may generate and display color data, which increases the realism of MR scenarios. Many of these MR systems display color data by sequentially projecting sub-images in different (e.g., primary) colors or "fields" (e.g., Red, Green, and Blue) corresponding to a color image in rapid succession. Projecting color sub-images at sufficiently high rates (e.g., 60 Hz, 120 Hz, etc.) may deliver a smooth color MR scenario in a user's mind.

Various optical systems generate images, including color images, at various depths for displaying MR (VR and AR) scenarios. Some such optical systems are described in U.S. Utility patent application Ser. No. 14/555,585 filed on Nov. 27, 2014, the contents of which are hereby expressly and fully incorporated by reference in their entirety, as though set forth in full.

MR systems may employ wearable display devices (e.g., head-worn displays, helmet-mounted displays, or smart glasses) that are at least loosely coupled to a user's head, and thus move when the user's head moves. If the user's head motions are detected by the display device, the data being displayed can be updated (e.g., "warped") to take the change in head pose (i.e., the orientation and/or location of user's head) into account.

As an example, if a user wearing a head-worn display device views a virtual representation of a virtual object on the display and walks around an area where the virtual object appears, the virtual object can be rendered for each viewpoint, giving the user the perception that they are walking around an object that occupies real space. If the head-worn display device is used to present multiple virtual objects, measurements of head pose can be used to render the scene to match the user's dynamically changing head pose and provide an increased sense of immersion.

Head-worn display devices that enable AR provide concurrent viewing of both real and virtual objects. With an "optical see-through" display, a user can see through transparent (or semi-transparent) elements in a display system to view directly the light from real objects in an environment. The transparent element, often referred to as a "combiner," superimposes light from the display over the user's view of the real world, where light from by the display projects an image of virtual content over the see-through view of the real objects in the environment. A camera may be mounted onto the head-worn display device to capture images or videos of the scene being viewed by the user.

Current optical systems, such as those in MR systems, optically render virtual content. Content is "virtual" in that it does not correspond to real physical objects located in respective positions in space. Instead, virtual content only exists in the brains (e.g., the optical centers) of a user of the head-worn display device when stimulated by light beams directed to the eyes of the user.

In some cases, a head-worn image display device may display virtual objects with respect to a real environment, and/or may allow a user to place and/or manipulate virtual objects with respect to the real environment. In such cases, the image display device may be configured to localize the user with respect to the real environment, so that virtual objects may be correctly displaced with respect to the real environment. Localization map may be used by head-worn image display device to perform localization. In particular, when performing localization, the image display device may obtain a real-time input image from camera system of the image display device, and match features in the input image with features of the localization map.

New methods and apparatuses for allowing user to access, manipulate, and position 3D virtual objects in environment presented by image display devices are described herein.

SUMMARY

This disclosure describes techniques for providing 3-dimensional (3D) models associated with elements shown (e.g., elements in a page of content) displayed within a computing system. The page may be displayed within a browser or other suitable application executing on the computing system. In some examples, the computing system may be a spatial computing system configured to present a mixed reality (MR), augmented reality (AR), and/or virtual reality (VR) environment to a user of the system. The elements displayed may be 2-dimensional (2D) or 3D elements. The model provided may be manipulated by a user in some embodiments. For example, a user may select a 2D element (e.g., an image, a graphic, etc.) displayed in a page to access a 3D model, and the accessed 3D model may then be placed by a user on or near a real-world or virtual object as perceived by the user via the spatial computing environment.

In particular, embodiments disclosed herein relate to systems, methods, and computer-readable media for accessing 3D models associated with page elements shown within a browser or other suitable application executing on a computing system. In some embodiments, the computing system is configured to provide a MR, AR, or VR environment to a user. In a VR environment, virtual objects are presented to a user in a manner that may simulate a real-world and/or artificial environment. In an AR environment, the system allowed the user to view at least a portion for their real-world environment, and presents virtual objects as an augmentation to the real-world environment. In an MR environment, the presentation of the virtual objects may be modified based on real-world objects. For example, a virtual object may be at least partly occluded by a real-world object, if the virtual object is presented in a position that appears to be behind the real-world object. Such an environment can also be described as a spatial computing environment, in which the virtual objects are presented in a manner that is informed by, and/or cognizant of, the presence and characteristics of the real-world objects being presented.

In some embodiments, a developer of a page can specify that an element is associated with an extractable model, such that a model of the element can be retrieved by a user and placed elsewhere in the presented environment. In some embodiments, specifying that an element is associated with an extractable model includes modifying the markup language of the page to add particular metadata (e.g., a tag, field, or attribute) that designates the element as associated with an extractable model. When the page is rendered, the metadata enables extraction of the model when the user performs an action, such as when the user clicks on the element. In some embodiments, the metadata is a toggle or flag (e.g., true or false) indicating that a model is extractable from the associated element.

In some embodiments, the model is previously created and stored (e.g., on a web server) with the page descriptor information, and the model is available to be communicated to the system when the user performs the designated action to extract the model. In such examples, the metadata for the page may also indicate a location from which the model can be retrieved (e.g., path to model). In some embodiments, the model may be dynamically generated and communicated to the system when the user performs the designated action. In such instances, a dynamically generated model may be cached for at least some period of time to be readily available for download in response to subsequent requests for the model. In some examples, the model may load and/or otherwise be available when the page loads in the browser. The model may also be retrieved through a request made to an application programming interface (API). Any suitable type or number of (e.g., 2D) elements in a page may be designated as extractable as 3D models.

Embodiments support any suitable action that is designated to trigger the accessing of the model. For example, the action may be the user clicking (or double-clicking, pressing and holding, long hold, etc.) on a totem button (e.g., trigger) or other control while their cursor is pointing at the element. As another example, the action may be the user hovering over the element with their cursor for at least a threshold period of time. As another example, the action may be the user speaking a keyword while the cursor is pointing at the element. Other suitable actions may also be supported.

In some embodiments, for an element that is extractable, the system may provide an indication that the element is extractable. For example, a cursor hover over the element may cause the element to change color or provide some other visible indication of extractability. As another example, a cursor hover over the element may cause the model to begin to grow out of the element until it reaches its full size, while moving as the user moves their cursor to place the model onto another virtual or real-world object presented in the environment.

The model may be of any suitable size or resolution, and may be adjusted to achieve desired performance characteristics on the system. For example, smaller models may be provided to reduce or otherwise optimize storage requirements, network latency, page load time, and/or other performance metrics. The model may be a 3D rendering or depiction of the 2D element. For example, if the 2D element is an image of an object, the model may be a 3D model of that object that can be presented in the spatial computing environment.

Element presentation and model extraction may be performed within a browser (e.g., web browser) or other suitable application executing on the computing system. For example, the model extraction feature may be available through the Helio™ browser provided by Magic Leap™.

A system includes: a screen configured for wear by a user, the screen configured to display a 2-dimensional (2D) element; a processing unit coupled to the display; and a user input device configured to generate a signal in response to a user input for selecting the 2D element displayed by the screen; wherein the processing unit is configured to obtain a 3-dimensional (3D) model associated with the 2D element in response to the generated signal.

Optionally, the user input device is configured to generate the signal in response to a double-clicking action, a press-and-hold action, a long hold action, a pressing of a button while a cursor is pointing at the 2D element, a hovering of the cursor over the 2D element for a threshold period of time, or an audio input.

Optionally, the 2D element indicates an object, and the 3D model is a three-dimensional version of the object.

Optionally, the 3D model is a 3D rendering or 3D depiction of the 2D element.

Optionally, the system is configured to provide an indication that the 2D element is selectable to access the 3D model.

Optionally, the screen is configured to provide a visual information as the indication.

Optionally, the visual information comprises a change in a color of the 2D element.

Optionally, the visual information comprises a graphic that is displayed in association with the 2D element.

Optionally, the visual information comprises a change in a configuration of a cursor.

Optionally, the visual information comprises a display of the 3D model beginning to grow out of the 2D element.

Optionally, the system is configured to provide an audio signal as the indication.

Optionally, the 2D element is presented within a browser or a viewer.

Optionally, the 3D model is stored in association with a page descriptor information.

Optionally, the 2D element is a part of a page, and wherein metadata for the page indicates a location from which the 3D model is to be retrieved.

Optionally, the 2D element is part of a page, and wherein markup language of the page comprises metadata that designates the 2D element as being associated with the 3D model.

Optionally, the 3D model is dynamically generated.

Optionally, the 2D element is a part of a page presented in a browser or viewer, and wherein the 3D model is loaded and/or made available when or after the page is loaded in the browser or the viewer.

Optionally, the processing unit is configured to retrieve the 3D model through a request made to an application programming interface (API).

Optionally, the processing unit is configured to obtain the 3D model associated with the 2D element by receiving the 3D model transmitted via a network.

Optionally, the system further includes a memory storing the 3D model, and wherein the processing unit is configured to obtain the 3D model by retrieving the 3D model from the memory.

Optionally, the 3D model is for addition to an environment that is presented by the system.

Optionally, the processing unit is configured to receive a command for placing the 3D model at a certain location with respect to an environment as viewed through the screen.

Optionally, the command comprises a cursor position generated based on a movement of a cursor to place the 3D model in association with a virtual object or a real-world object with respect to the environment.

Optionally, the screen is at least partially transparent for allowing the user to view a surrounding environment through the screen.

Optionally, the system is configured to provide a MR, AR, or VR environment to the user.

A method includes: displaying, by a screen that is configured for wear by a user, a 2-dimensional (2D) element; receiving a signal generated by a user input device in response to a user input for selecting the 2D element displayed by the screen; and obtaining a 3-dimensional (3D) model associated with the 2D element in response to the generated signal.

Optionally, the signal is generated in response to a double-clicking action, a press-and-hold action, a long hold action, a pressing of a button while a cursor is pointing at the 2D element, a hovering of the cursor over the 2D element for a threshold period of time, or an audio input.

Optionally, the 2D element indicates an object, and the 3D model is a three-dimensional version of the object.

Optionally, the 3D model is a 3D rendering or 3D depiction of the 2D element.

Optionally, the method further includes providing an indication that the 2D element is selectable to access the 3D model.

Optionally, the indication comprises a visual information.

Optionally, the visual information comprises a change in a color of the 2D element.

Optionally, the visual information comprises a graphic that is displayed in association with the 2D element.

Optionally, the visual information comprises a change in a configuration of a cursor.

Optionally, the visual information comprises a display of the 3D model beginning to grow out of the 2D element.

Optionally, the act of providing the indication comprises providing an audio signal.

Optionally, the 2D element is presented within a browser or a viewer.

Optionally, the 3D model is stored in association with a page descriptor information.

Optionally, the 2D element is a part of a page, and wherein metadata for the page indicates a location from which the 3D model is to be retrieved.

Optionally, the 2D element is part of a page, and wherein markup language of the page comprises metadata that designates the 2D element as being associated with the 3D model.

Optionally, the 3D model is dynamically generated.

Optionally, the 2D element is a part of a page presented in a browser or viewer, and wherein the 3D model is loaded and/or made available when or after the page is loaded in the browser or the viewer.

Optionally, the act of obtaining the 3D model comprises retrieving, by a processing unit, the 3D model through a request made to an application programming interface (API).

Optionally, the act of obtaining the 3D model associated with the 2D element comprises receiving the 3D model transmitted via a network.

Optionally, the 3D model is stored in a memory, and wherein the act of obtaining the 3D model comprises retrieving the 3D model from the memory.

Optionally, the 3D model is for addition to an environment that is presented by the system.

Optionally, the method further includes receiving a command for placing the 3D model at a certain location with respect to an environment as viewed through the screen.

Optionally, the command comprises a cursor position generated based on a movement of a cursor to place the 3D model in association with a virtual object or a real-world object with respect to the environment.

Optionally, the screen is at least partially transparent for allowing the user to view a surrounding environment through the screen.

Optionally, the method is performed by a system that is configured to provide a MR, AR, or VR environment to the user.

A product includes a non-transitory medium storing a set of instructions, an execution of which by a processing unit will cause a method to be performed, the method comprising: displaying, by a screen that is configured for wear by a user, a 2-dimensional (2D) element; receiving a signal generated by a user input device in response to a user input for selecting the 2D element displayed by the screen; and obtaining a 3-dimensional (3D) model associated with the 2D element in response to the generated signal.

Additional and other objects, features, and advantages of the disclosure are described in the detail description, figures and claims.

BRIEF DESCRIPTION OF THE DRAWINGS

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosures briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which:

FIGS. 10A-10B illustrate examples of implementations of one or more embodiments of 3D models that are associated with HTML elements.

DETAILED DESCRIPTION

Figure 1:
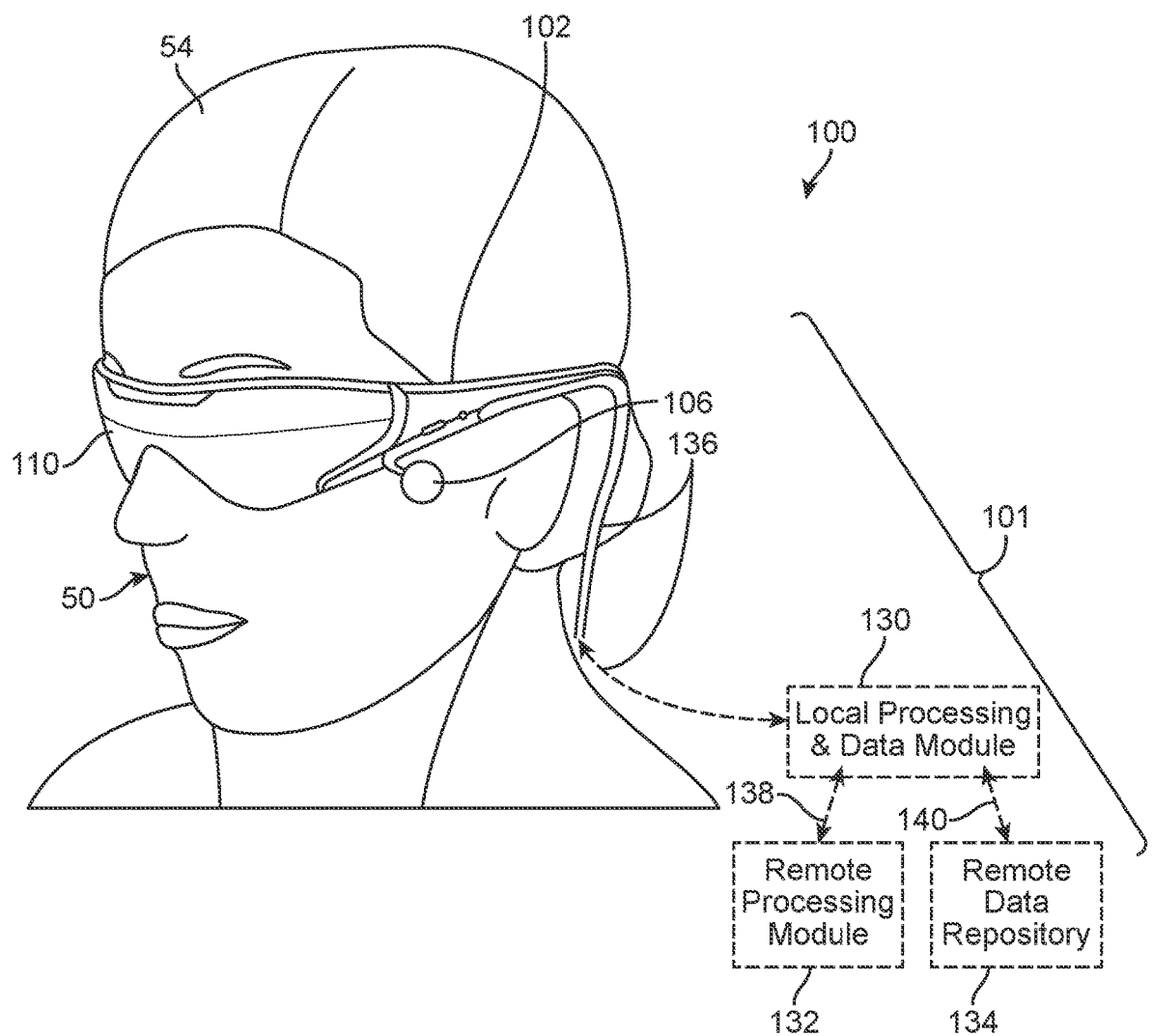
FIG. 1 illustrates another image display system having an image display device in accordance with some embodiments.
Figure 2:
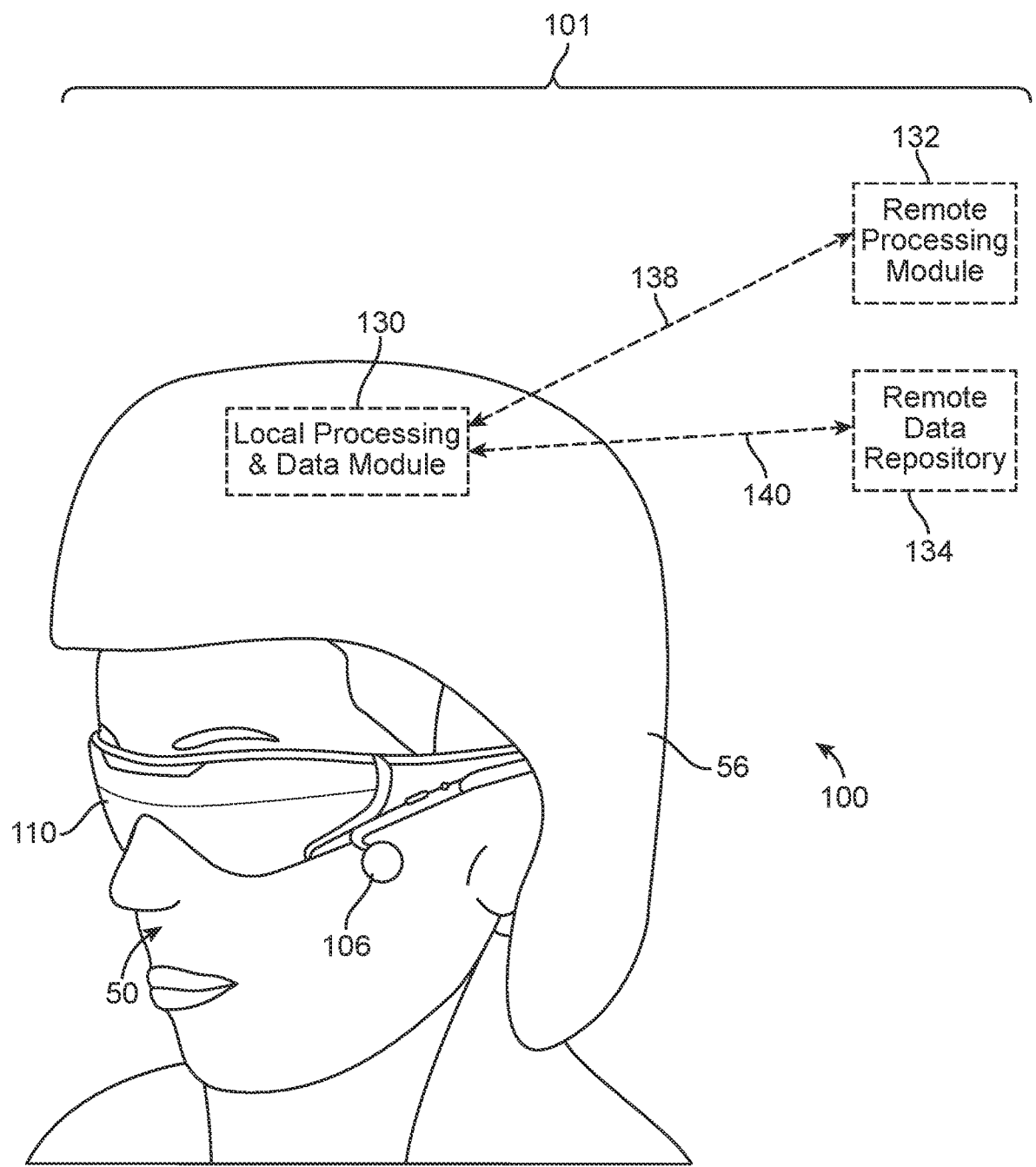
FIG. 2 illustrates another image display system having an image display device in accordance with other embodiments.
Figure 3:
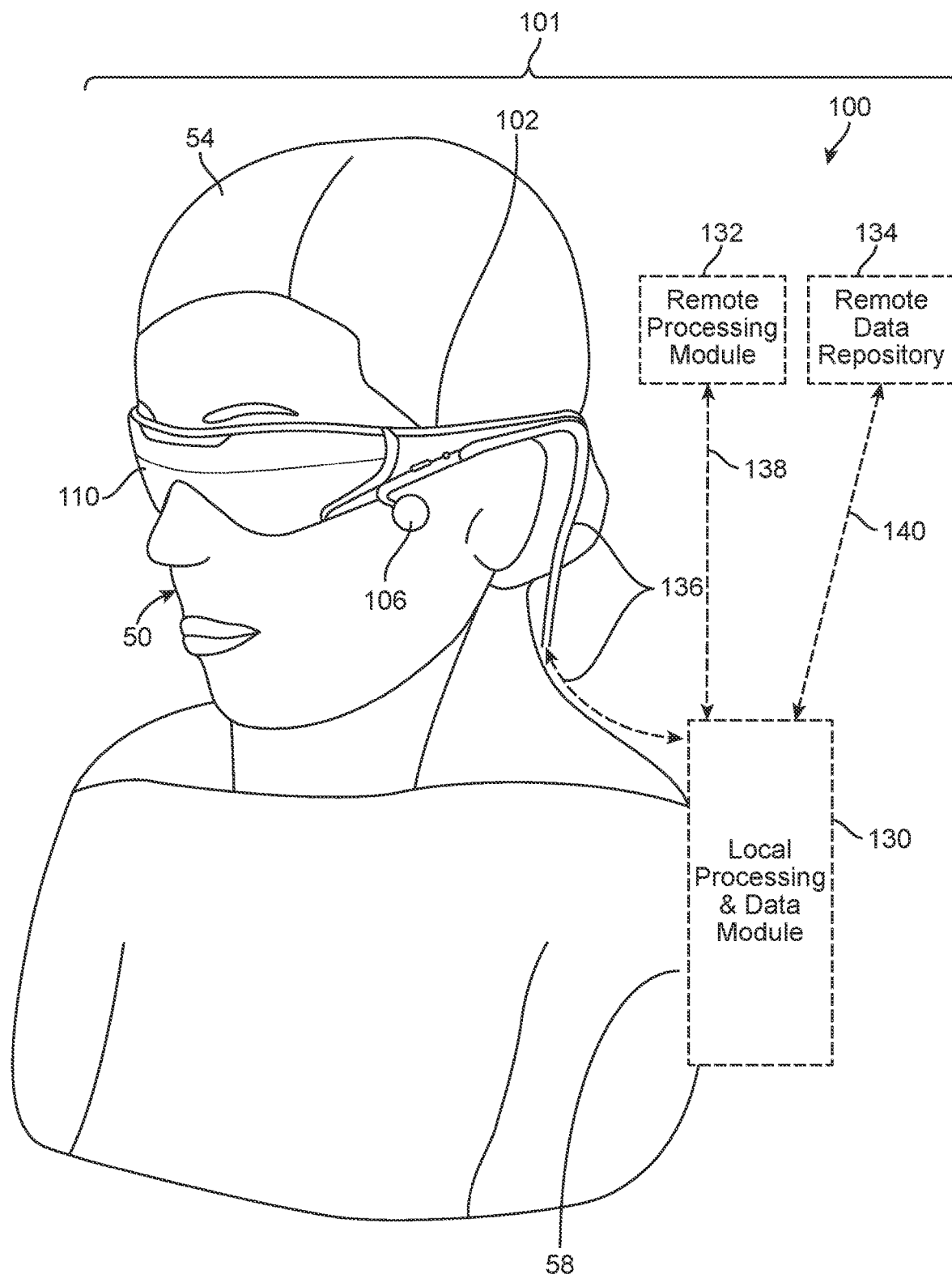
FIG. 3 illustrates another image display system having an image display device in accordance with other embodiments.

Various embodiments of the disclosure are directed to methods, apparatuses, and articles of manufacture for providing input for head-worn video image devices. Other objects, features, and advantages of the disclosure are described in the detailed description, figures, and claims.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The description that follows pertains to an illustrative VR, AR, and/or MR system with which embodiments described herein may be practiced. However, it is to be understood that the embodiments also lend themselves to applications in other types of display systems (including other types of VR, AR, and/or MR systems), and therefore the embodiments are not to be limited to only the illustrative examples disclosed herein.

FIGS. 1-4 illustrate various components of an image display system 100 in various embodiments. The image display system 100 includes an image display device 101, and an apparatus 200 for providing input for the image display device 101. The apparatus 200 will be described in further detail below. The image display device 101 may be a VR device, an AR device, a MR device, or any of other types of display devices. The image display device 101 includes a frame structure 102 worn by an end user 50, a display subsystem 110 carried by the frame structure 102, such that the display subsystem 110 is positioned in front of the eyes of the end user 50, and a speaker 106 carried by the frame structure 102, such that the speaker 106 is positioned adjacent the ear canal of the end user 50 (optionally, another speaker (not shown) is positioned adjacent the other ear canal of the end user 50 to provide for stereo/shapeable sound control). The display subsystem 110 is designed to present the eyes of the end user 50 with light patterns that can be comfortably perceived as augmentations to physical reality, with high-levels of image quality and three-dimensional perception, as well as being capable of presenting two-dimensional content. The display subsystem 110 presents a sequence of frames at high frequency that provides the perception of a single coherent scene.

In the illustrated embodiments, the display subsystem 110 employs "optical see-through" display through which the user can directly view light from real objects via transparent (or semi-transparent) elements. The transparent element, often referred to as a "combiner," superimposes light from the display over the user's view of the real world. To this end, the display subsystem 110 comprises a partially transparent display. The display is positioned in the end user's 50 field of view between the eyes of the end user 50 and an ambient environment, such that direct light from the ambient environment is transmitted through the display to the eyes of the end user 50.

In the illustrated embodiments, an image projection assembly provides light to the partially transparent display, thereby combining with the direct light from the ambient environment, and being transmitted from the display to the eyes of the user 50. The projection subsystem may be an optical fiber scan-based projection device, and the display may be a waveguide-based display into which the scanned light from the projection subsystem is injected to produce, e.g., images at a single optical viewing distance closer than infinity (e.g., arm's length), images at multiple, discrete optical viewing distances or focal planes, and/or image layers stacked at multiple viewing distances or focal planes to represent volumetric 3D objects. These layers in the light field may be stacked closely enough together to appear continuous to the human visual subsystem (i.e., one layer is within the cone of confusion of an adjacent layer). Additionally, or alternatively, picture elements may be blended across two or more layers to increase perceived continuity of transition between layers in the light field, even if those layers are more sparsely stacked (i.e., one layer is outside the cone of confusion of an adjacent layer). The display subsystem 110 may be monocular or binocular.

The image display device 101 may also include one or more sensors (not shown) mounted to the frame structure 102 for detecting the position and movement of the head 54 of the end user 50 and/or the eye position and inter-ocular distance of the end user 50. Such sensors may include image capture devices (such as cameras), microphones, inertial measurement units, accelerometers, compasses, GPS units, radio devices, and/or gyros), or any combination of the foregoing. Many of these sensors operate on the assumption that the frame 102 on which they are affixed is in turn substantially fixed to the user's head, eyes, and ears.

The image display device 101 may also include a user orientation detection module. The user orientation module detects the instantaneous position of the head 54 of the end user 50 (e.g., via sensors coupled to the frame 102) and may predict the position of the head 54 of the end user 50 based on position data received from the sensors. Detecting the instantaneous position of the head 54 of the end user 50 facilitates determination of the specific actual object that the end user 50 is looking at, thereby providing an indication of the specific virtual object to be generated in relation to that actual object and further providing an indication of the position in which the virtual object is to be displayed. The user orientation module may also track the eyes of the end user 50 based on the tracking data received from the sensors.

The image display device 101 may also include a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs).

The control subsystem of the image display device 101 may include a central processing unit (CPU), a graphics processing unit (GPU), one or more frame buffers, and a three-dimensional data base for storing three-dimensional scene data. The CPU may control overall operation, while the GPU may render frames (i.e., translating a three-dimensional scene into a two-dimensional image) from the three-dimensional data stored in the three-dimensional data base and store these frames in the frame buffers. One or more additional integrated circuits may control the reading into and/or reading out of frames from the frame buffers and operation of the image projection assembly of the display subsystem 110.

Figure 4:
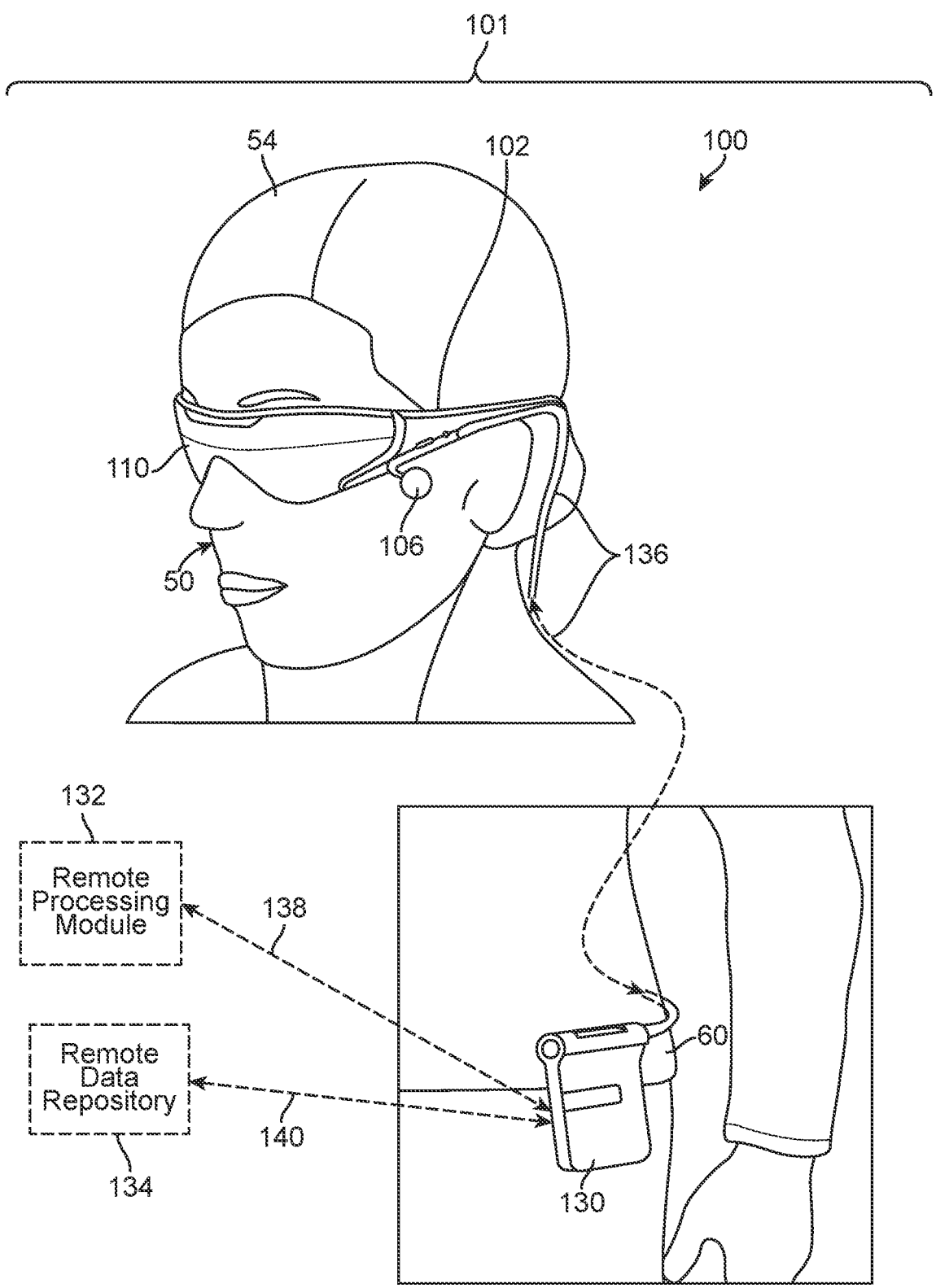
FIG. 4 illustrates another image display system having an image display device in accordance with other embodiments.

The various processing components of the image display device 101 may be physically contained in a distributed subsystem. For example, as illustrated in FIGS. 1-4, the image display device 101 may include a local processing and data module 130 operatively coupled, such as by a wired lead or wireless connectivity 136, to the display subsystem 110 and sensors. The local processing and data module 130 may be mounted in a variety of configurations, such as fixedly attached to the frame structure 102 (FIG. 1), fixedly attached to a helmet or hat 56 (FIG. 2), removably attached to the torso 58 of the end user 50 (FIG. 3), or removably attached to the hip 60 of the end user 50 in a belt-coupling style configuration (FIG. 4). The image display device 101 may also include a remote processing module 132 and remote data repository 134 operatively coupled, such as by a wired lead or wireless connectivity 138, 140, to the local processing and data module 130, such that these remote modules 132, 134 are operatively coupled to each other and available as resources to the local processing and data module 130.

The local processing and data module 130 may comprise a power-efficient processor or controller, as well as digital memory, such as flash memory, both of which may be utilized to assist in the processing, caching, and storage of data captured from the sensors and/or acquired and/or processed using the remote processing module 132 and/or remote data repository 134, possibly for passage to the display subsystem 110 after such processing or retrieval. The remote processing module 132 may comprise one or more relatively powerful processors or controllers configured to analyze and process data and/or image information. The remote data repository 134 may comprise a relatively large-scale digital data storage facility, which may be available through the internet or other networking configuration in a "cloud" resource configuration. In some embodiments, all data is stored and all computation is performed in the local processing and data module 130, allowing fully autonomous use from any remote modules.

The couplings 136, 138, 140 between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless. In still further implementations, the choice of wired and wireless communications may be different from that illustrated in FIGS. 1-4. Thus, the particular choice of wired or wireless communications should not be considered limiting.

In some embodiments, the user orientation module is contained in the local processing and data module 130, while CPU and GPU are contained in the remote processing module. In alternative embodiments, the CPU, GPU, or portions thereof may be contained in the local processing and data module 130. The 3D database can be associated with the remote data repository 134 or disposed locally.

Some image display systems (e.g., VR system, AR system, MR system, etc.) use a plurality of volume phase holograms, surface-relief holograms, or light guiding optical elements that are embedded with depth plane information to generate images that appear to originate from respective depth planes. In other words, a diffraction pattern, or diffractive optical element ("DOE") may be embedded within or imprinted/embossed upon a light guiding optical element ("LOE"; e.g., a planar waveguide) such that as collimated light (light beams with substantially planar wavefronts) is substantially totally internally reflected along the LOE, it intersects the diffraction pattern at multiple locations and exits toward the user's eye. The DOEs are configured so that light exiting therethrough from an LOE are verged so that they appear to originate from a particular depth plane. The collimated light may be generated using an optical condensing lens (a "condenser").

For example, a first LOE may be configured to deliver collimated light to the eye that appears to originate from the optical infinity depth plane (0 diopters). Another LOE may be configured to deliver collimated light that appears to originate from a distance of 2 meters (½ diopter). Yet another LOE may be configured to deliver collimated light that appears to originate from a distance of 1 meter (1 diopter). By using a stacked LOE assembly, it can be appreciated that multiple depth planes may be created, with each LOE configured to display images that appear to originate from a particular depth plane. It should be appreciated that the stack may include any number of LOEs. However, at least N stacked LOEs are required to generate N depth planes. Further, N, 2N or 3N stacked LOEs may be used to generate RGB colored images at N depth planes.

In order to present 3-D virtual content to the user, the image display system 100 (e.g., VR system, AR system, MR system, etc.) projects images of the virtual content into the user's eye so that they appear to originate from various depth planes in the Z direction (i.e., orthogonally away from the user's eye). In other words, the virtual content may not only change in the X and Y directions (i.e., in a 2D plane orthogonal to a central visual axis of the user's eye), but it may also appear to change in the Z direction such that the user may perceive an object to be very close or at an infinite distance or any distance in between. In other embodiments, the user may perceive multiple objects simultaneously at different depth planes. For example, the user may see a virtual dragon appear from infinity and run towards the user. Alternatively, the user may simultaneously see a virtual bird at a distance of 3 meters away from the user and a virtual coffee cup at arm's length (about 1 meter) from the user.

Figure 5:
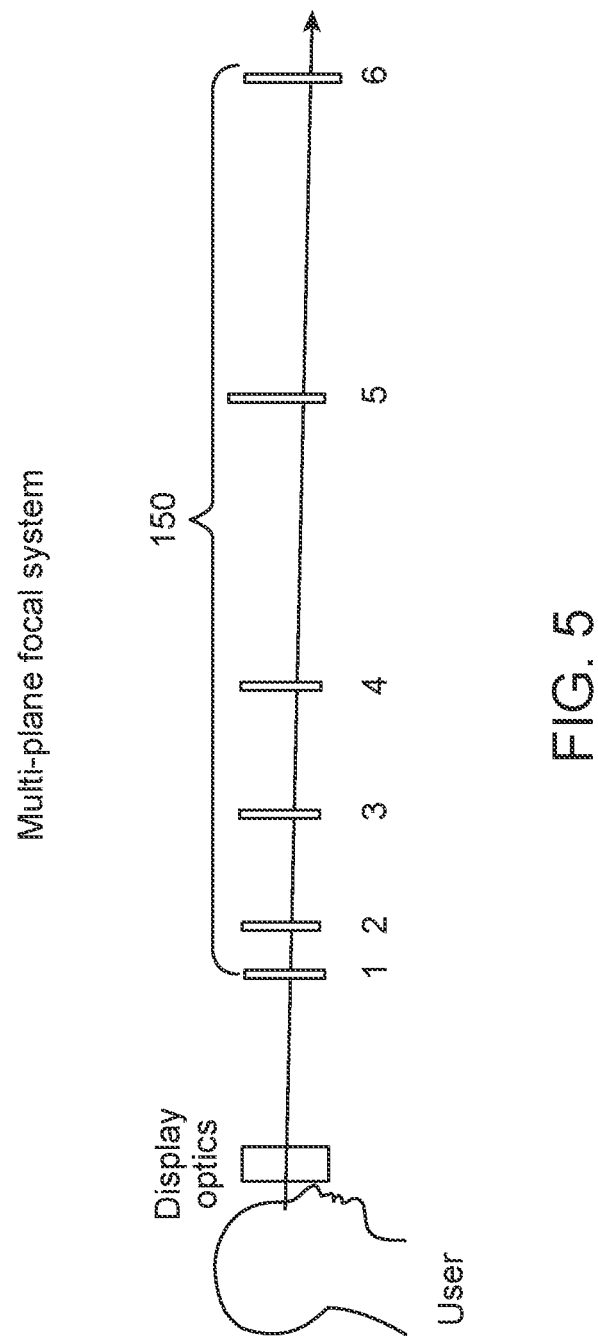
FIG. 5 illustrates an image display device displaying frames in multiple depth planes.

Multiple-plane focus systems create a perception of variable depth by projecting images on some or all of a plurality of depth planes located at respective fixed distances in the Z direction from the user's eye. Referring now to FIG. 5, it should be appreciated that multiple-plane focus systems may display frames at fixed depth planes 150 (e.g., the six depth planes 150 shown in FIG. 5). Although MR systems can include any number of depth planes 150, one exemplary multiple-plane focus system has six fixed depth planes 150 in the Z direction. In generating virtual content one or more of the six depth planes 150, 3-D perception is created such that the user perceives one or more virtual objects at varying distances from the user's eye. Given that the human eye is more sensitive to objects that are closer in distance than objects that appear to be far away, more depth planes 150 are generated closer to the eye, as shown in FIG. 5. In other embodiments, the depth planes 150 may be placed at equal distances away from each other.

Depth plane positions 150 may be measured in diopters, which is a unit of optical power equal to the inverse of the focal length measured in meters. For example, in some embodiments, depth plane 1 may be ⅓ diopters away, depth plane 2 may be 0.3 diopters away, depth plane 3 may be 0.2 diopters away, depth plane 4 may be 0.15 diopters away, depth plane 5 may be 0.1 diopters away, and depth plane 6 may represent infinity (i.e., 0 diopters away). It should be appreciated that other embodiments may generate depth planes 150 at other distances/diopters. Thus, in generating virtual content at strategically placed depth planes 150, the user is able to perceive virtual objects in three dimensions. For example, the user may perceive a first virtual object as being close to him when displayed in depth plane 1, while another virtual object appears at infinity at depth plane 6. Alternatively, the virtual object may first be displayed at depth plane 6, then depth plane 5, and so on until the virtual object appears very close to the user. It should be appreciated that the above examples are significantly simplified for illustrative purposes. In another embodiment, all six depth planes may be concentrated on a particular focal distance away from the user. For example, if the virtual content to be displayed is a coffee cup half a meter away from the user, all six depth planes could be generated at various cross-sections of the coffee cup, giving the user a highly granulated 3-D view of the coffee cup.

In some embodiments, the image display system 100 (e.g., VR system, AR system, MR system, etc.) may work as a multiple-plane focus system. In other words, all six LOEs may be illuminated simultaneously, such that images appearing to originate from six fixed depth planes are generated in rapid succession with the light sources rapidly conveying image information to LOE 1, then LOE 2, then LOE 3 and so on. For example, a portion of the desired image, comprising an image of the sky at optical infinity may be injected at time 1 and the LOE retaining collimation of light (e.g., depth plane 6 from FIG. 5) may be utilized. Then an image of a closer tree branch may be injected at time 2 and an LOE configured to create an image appearing to originate from a depth plane 10 meters away (e.g., depth plane 5 from FIG. 5) may be utilized; then an image of a pen may be injected at time 3 and an LOE configured to create an image appearing to originate from a depth plane 1 meter away may be utilized. This type of paradigm can be repeated in rapid time sequential (e.g., at 360 Hz) fashion such that the user's eye and brain (e.g., visual cortex) perceives the input to be all part of the same image.

The image display system 100 may project images (i.e., by diverging or converging light beams) that appear to originate from various locations along the Z axis (i.e., depth planes) to generate images for a 3-D experience/scenario. As used in this application, light beams include, but are not limited to, directional projections of light energy (including visible and invisible light energy) radiating from a light source. Generating images that appear to originate from various depth planes conforms the vergence and accommodation of the user's eye for that image, and minimizes or eliminates vergence-accommodation conflict.

In some embodiments, the image display system 100 may also include a user input device that allows a user to input information. The user input device may be a touchpad, a mouse, a joystick, a button, a switch, a knob, a handheld controller, a camera, a depth sensor, etc., or any device that is capable of detecting a user's action. In some cases, the user input device may be a microphone configured to detect a user's voice as input. Also, in some embodiments, the user input device is configured to generate one or more signals to control one or more elements displayed by the image display device 101 based on the user input.

Figure 6:
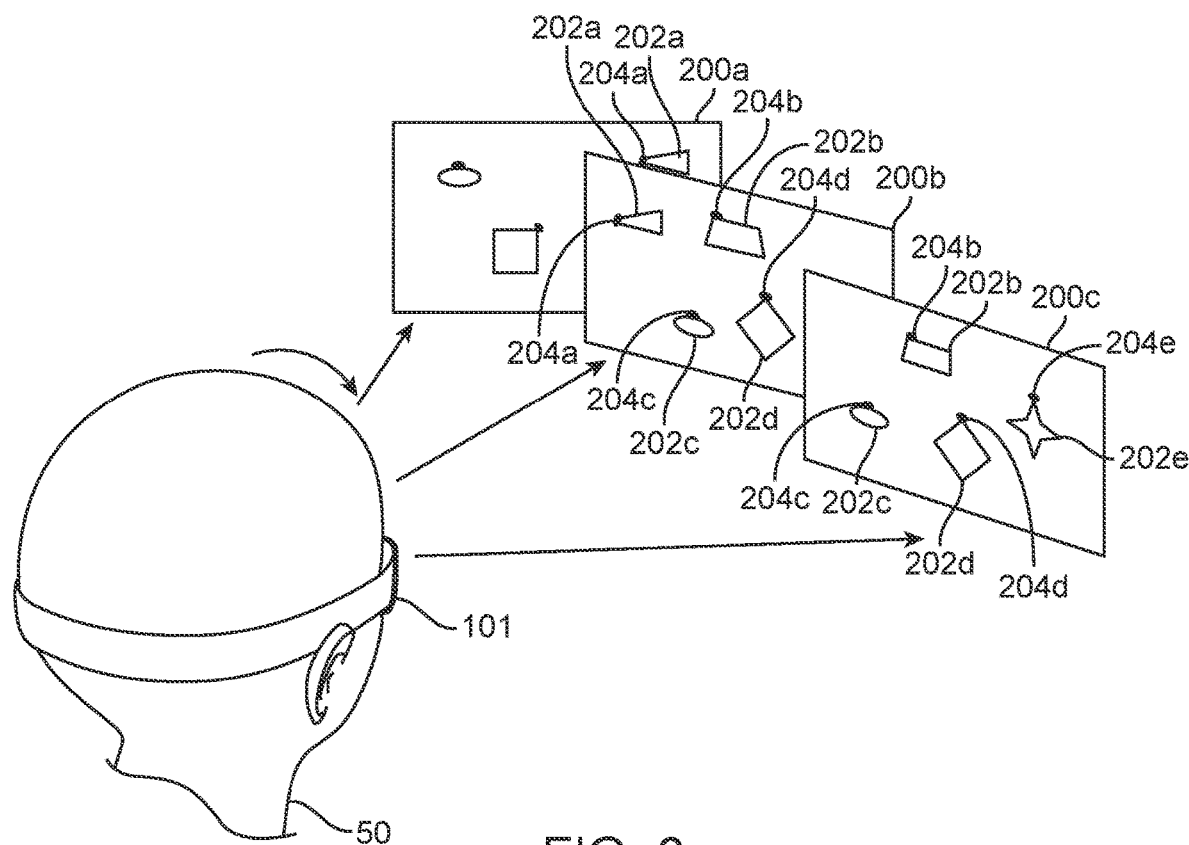
FIG. 6 illustrates a method for determining a map for allowing an image display device to localize a user of the image display device, and/or to perform other function(s).

FIG. 6 illustrates a method for determining a map for allowing the image display device 101 to localize the user 50 of the image display device 101. As shown in the figure, when the user 50 is using the image display device 101, the user 50 can move the image display device 101 to achieve different viewing locations and/or directions. For example, the user 50 may turn his/her head, turn his/her body, and/or walk to different locations. In some embodiments, the image display device 101 includes a forward facing camera. Thus, by moving the image display device 101, the field of view of the forward facing camera of the image display device 101 will change accordingly. While the user 50 is at different poses, the camera of the image display device 101 generates corresponding images. In the illustrated example, the user 50 achieves three different poses by turning his/her head, and the forward facing camera of the image display device 101 generates three images 200a-200c that correspond with the three poses. Each of the images 200a-200c captures certain objects 202 in the environment. For example, image 200b captures objects 202a-202d, and image 200c captures objects 202b-202e. Depending on the poses achieved by the user 50, a certain object in the environment may be captured in multiple images 202 of the camera, and certain other objects may be captured in only one image 200. In some embodiments, the processing unit 130 of the image display device 101 is configured to obtain the images 200 from the camera of the image display device 101, and perform image processing to extract features (e.g., corners, edges, user-defined features, etc.) from the images 200 to create a map 220. The map 200 may be stored in a non-transitory medium of the image display device 101, and may be used by the processing unit 130 to perform localization of the user 50. Thus, the map 220 functions as a localization map. In the illustrated embodiments, the map 220 is a three-dimensional representation of the environment detected by the different poses of the user 50.

Figure 7:
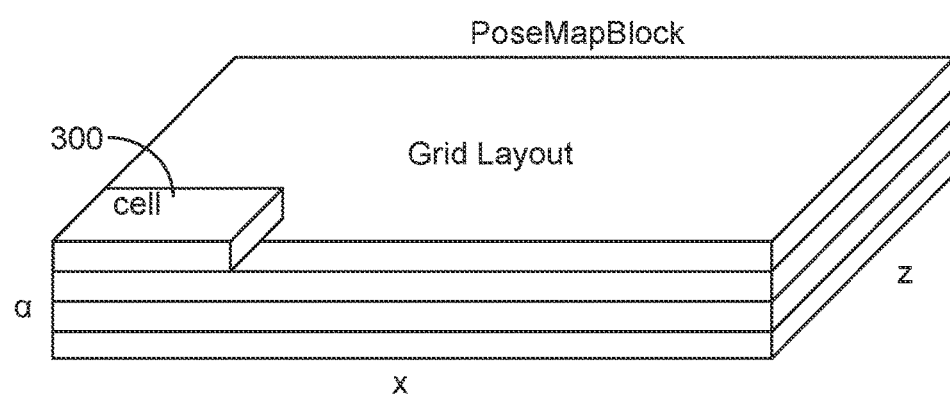
FIG. 7 illustrates an example of an environment being divided into multiple cells.

In some embodiments, the environment surrounding the user 50 may be divided into multiple cells. In such cases, the above map creation technique may be employed for the different cells of the environment. FIG. 7 illustrates an example of an environment being divided into multiple cells 300. Each cell 300 is a defined three-dimensional space representing a portion of the environment. Each cell 300 may have a pre-determined size and shape. For example, each cell 300 may have a footprint area that is 2 m×2 m, and a height that is 2 m. Each cell 300 may have other footprint dimensions and/or other heights in other embodiments. Also, in other embodiments, each cell 300 may not have a rectangular configuration shown, and may have other shapes. In the illustrated embodiments, the cells 300 all have the same shape and dimensions. In other embodiments, at least two of the cells 300 may have different respective dimensions and/or shapes.

In some embodiments, the user 50 of the image display device 101 may go to different locations in the environment corresponding to the different cells 300, and may scan the spaces in the corresponding cells using the camera of the image display device 101 to obtain different maps for the respective cells of the environment. The maps may be stored in the non-transitory medium of the image display device 101 for allowing the processing unit 130 of the image display device 101 to perform localization of the user 50.

During use of a map to localize the user 50, the camera of the image display device 101 obtains an image of the environment based on a certain position and orientation of the user 50. Such camera image serves as a tracking image (tracking map) for allowing the processing unit 130 of the image display device 101 to track a position of the user 50. In particular, the processing unit 130 of the image display device 101 processes the image from the camera to determine if features (e.g., corners, edges, user-defined features, etc.) in the image match with certain features in the map 220. If a match is found, the processing unit 130 may then determine the position and orientation of the user 50 based on the matched features. In some embodiments, the map 220 may contain less information (e.g., features) than the tracking image provided by the camera of the image display device 101. This is advantageous because it allows the processing unit 130 to efficiently match the tracking image with the map 220. Also, in some embodiments, the map 220 may be called a "canonical map". When performing localization, the processing unit 130 performs features extraction to extra features from camera image (tracking image), and matches the features with those in the canonical map. In one implementation, the processing unit 130 is configured to find a six degree of freedom transformation between the tracking image and the canonical map to localize the user 50. Once the user 50 can be successfully localize with respect to his/her environment using the map, the processing unit 130 may then allow the user to place virtual content with respect to the environment using the map, retrieve the virtual content from previous session, share the virtual content with other user(s), etc.

During use of the image display device 101, the processing unit 130 may need to perform corner detection in images provided by the camera system of the image display device 101. For example, in some embodiments, when determining the map 220 using camera images, the processing unit 130 may detect corners in these images. The detected corners may be utilized by the processing unit 130 as features to construct the map 220. Alternatively, or additionally, when determining the map 220, the processing unit 130 may detect other feature(s), such as edge(s) or user-defined feature(s). Also, when performing localization using the map 220, the processing unit 130 may need to match features in a real-time input image with features of the map 220. Accordingly, the processing unit 130 may be configured to detect features, such as corners, edges, user-defined features, etc., in real-time input images. Corners are generally more stable features in the sense that corners are generally detectable from different viewing direction. Accordingly, the detectability of corners in images may not be significantly affected by change in view point. Therefore, corners are good features to match between input images and the map 220. Corners are also good features to use in stereo matching between images generated at different times and at different viewing directions.

3D Model of 2D Element

Figure 8:
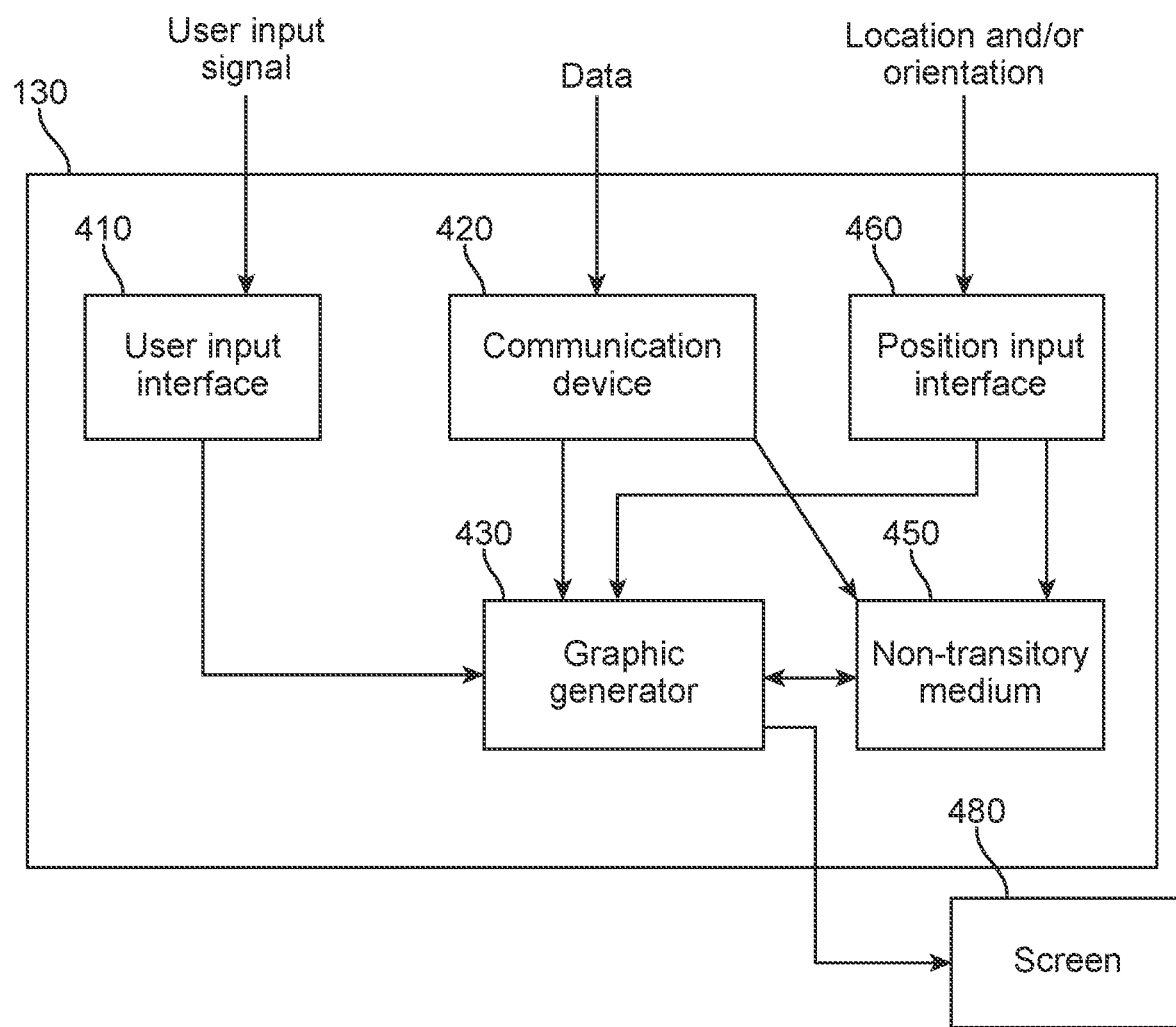
FIG. 8 illustrates a processing unit of an image display device.

FIG. 8 illustrates a processing unit 130 of the image display device 101, according to some embodiments. As shown in the figure, the processing unit 130 includes a user input interface 410, a communication device 420, a graphic generator 430, a non-transitory medium 450, and a position input interface 460. The user input interface 410 is configured to receive a user input transmitted from a user input device.

The user input interface 410 is configured to interface with a user input device. By means of non-limiting examples, the user input device may be a touchscreen, a touchpad, a mouse, a joystick, one or more buttons, a keyboard, a knob, a handheld controller, a microphone, a camera, a depth sensor, or any device that is configured to detect user input. The user input device is configured to detect user input (e.g., user's action, user's gesture, audio command, etc.), and to generate a signal in response to the detected user input. The signal is then transmitted to the processing unit 130 via the user input interface 410.

In other embodiments, the user input interface 410 may be implemented outside the processing unit 130. In such cases, the processing unit 130 does not include the user input interface 410.

The communication device 420 is configured to receive data transmitted from another device (e.g., a component of the image display device, a server, a base station, a remote computing device, etc.). The transmission of the data may be a wireless transmission and/or a wired transmission. In some embodiments, the communication device 420 may be a transceiver and/or an antenna configured to receive data wirelessly. In other embodiments, the communication device 420 may be a communication port (e.g., connector) configured to receive data via a cable. In further embodiments, the communication device 420 may be any communication interface (e.g., a software communication interface and/or hardware communication interface) configured to receive data transmitted from another device (e.g., component) wirelessly or via a cable. Also, in some embodiments, the communication device 420 may obtain data regarding an element to be displayed by the screen 480. The element to be displayed by the screen 480 may be a 2D element (e.g., an image of an object) in some embodiments. By means of non-limiting examples, the image of the object may be a picture of an object, a computer-generated image, a content of a page (e.g., a webpage), or any content that can be presented to the user visually. Also, in some embodiments, the data regarding the element to be displayed may be information regarding a 3D model that is associated with a 2D element (e.g., image data). The information regarding the 3D model may be data of the 3D model itself, address from which the 3D model may be retrieved, memory storage location of the 3D model, or any data from which the 3D model may be derived.

In other embodiments, the communication device 420 may be implemented outside the processing unit 130. In such cases, the processing unit 130 does not include the communication device 420.

The graphic generator 430 is configured to generate graphics for display by the screen 480. In some embodiments, the graphic generator 430 may generate graphics (e.g., one or more 2D elements) based on data received by the communication device 420, and may output the graphics for display by the screen 480. Alternatively, or additionally, the graphic generator 430 may also retrieve data from the non-transitory medium 450, and generate graphics based on the retrieved data. Also, in some embodiments, the graphic generator 430 may obtain a 3D model, and may generate graphics (for display by the screen 480) based on the 3D model. The 3D model may be obtained by the processing unit 130 via the communication device 420, and/or may be obtained by the processing unit 130 retrieving it from the non-transitory medium 450. It should be noted that as used in this specification, the term "3D model" may refer to a 3D configuration of an object, a 3D representation of an object, a 3D object itself, or any data that represents or that can be used to derive information regarding a 3D configuration or 3D representation of an object. For example, in some embodiments, the 3D model may include data relating to a shape and geometry of an object.

The non-transitory medium 450 is configured to store information relating to the operation and/or functionalities of the processing unit 130. In some embodiments, the data received from the communication device 420 may be stored in the non-transitory medium 450. The data stored in the non-transitory medium 450 may be content data that may be processed by the graphic generator 430 to generate graphics for display by the screen 480. The non-transitory medium 450 may also store information regarding a 3D model that is associated with a 2D element. The information regarding the 3D model stored in the non-transitory medium 450 may be data of the 3D model itself, address from which the 3D model may be retrieved, memory storage location of the 3D model, or any data from which the 3D model may be derived. The non-transitory medium 450 may be a cache, a memory unit, a register, or any storage device that is capable of storing data temporarily (e.g., during an operation or during use of the processing unit 130) or more long term (e.g., data storage even when the device is turned off).

In other embodiments, the non-transitory medium 450 may be implemented outside the processing unit 130. In such cases, the processing unit 130 does not include the non-transitory medium 450.

The position input interface 460 is configured to receive information regarding a location and/or an orientation of a user. In some embodiments, the position input interface 460 may be configured to interface with a location sensor (e.g., a GPS device), and/or an orientation sensor (e.g., a accelerometer, a gyroscope, etc.). The position input interface 460 obtains the information regarding the location and/or orientation of the user, and transmits the information to the graphic generator 430. In such cases, the graphic generator 430 may be configured to generate graphics based on the information regarding the location and/or orientation of the user. For example, the graphic generator 430 may be configured to generate graphics representing a view of an object based on the location and orientation of the user. In such cases, as the user moves relative to his/her surrounding environment, the graphic generator 430 may adjust the graphics to provide an appearance that the view of the object is changing in accordance with the user's location and/or orientation. Alternatively, or in addition to generating the graphics based on the information regarding the location and/or orientation of the user, the position input interface 460 may transmit the information regarding the location and/or orientation of the user to the non-transitory medium 450 for storage.

In other embodiments, the position input interface 460 may be implemented outside the processing unit 130. In such cases, the processing unit 130 does not include the position input interface 460.

One or more components of the processing unit 130 may be implemented using hardware, software, or a combination of both. In particular, the user input interface 410, the communication device 420, the graphic generator 430, the position input interface 460, or any combination of the foregoing, may be implemented using hardware, software, or a combination of both. Hardware may include conductor, integrated circuit(s), one or more hardware processors, etc. Software may include any coding, such as script, commands, application, programs, etc.

Figure 9A:
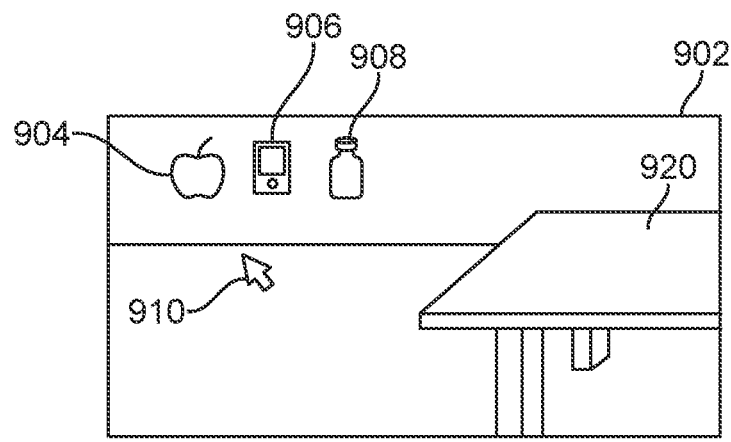
FIG. 9A illustrates examples of two-dimensional (2D) elements presented by a screen of an image display system.

During use of the image display device 101, the processing unit 130 obtains data via the communication device 420. The data may be transmitted from any device, such as a server, a cloud computing system, a base station, or any of other devices that can communicate directly or indirectly with the image display device 101. In some embodiments, the communication device 420 may obtain data regarding one or more 2D elements. The graphic generator 430 generates graphics based on the data regarding the one or more 2D elements, and outputs the graphics for display by the screen 480. FIG. 9A illustrates examples of 2D elements presented by a screen 902 of an image display device. The screen 902 may be an example of the screen 480 (e.g., display subsystem 110). In the illustrated example, the screen 902 is configured for wear by a user of the image display device. The screen 902 is at least partially transparent for allowing the user to view his/her surrounding environment. As shown in the figure, the user can see a table 920 in his/her surrounding environment through the screen 902. The table 920 is a real physical object. In other embodiments, the screen 902 is not transparent, and the user cannot view the surrounding environment through the screen. The screen 902 also displays 2D elements 904, 906, 908 that are graphics (e.g., object images) for viewing by the user. The screen 902 further displays a cursor 910, which is controllable by the user via a user input device.

Figure 9B:
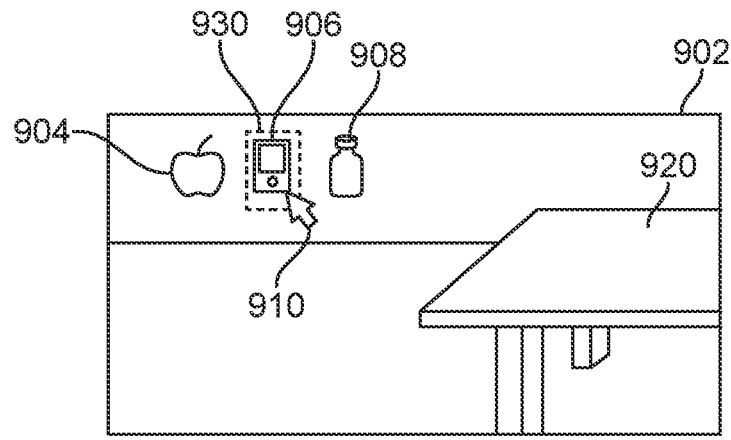
FIG. 9B illustrates an example of an indicator for indicating that a three-dimensional (3D) model is accessible for the two-dimensional element of FIG. 9A.

As shown in FIG. 9B, the user may operate the user input device to move the cursor 910 so that the cursor 910 is pointing at 2D element 906 (which is an image of a mobile phone in the illustrated example). In response to the cursor 910 being in an associated position with respect to the 2D element 906, the processing unit 130 then provides an indicator 930 (e.g., generated by the graphic generator 430) for display by the screen 902. The indicator 930 indicates to the user that the 2D element 906 has an associated 3D model that may be retrieved. If the user selects the 2D element 906 (e.g., by double-clicking on the 2D element 906, by pressing- and holding, by providing an audio command, etc.), the processing unit 130 then obtains a 3D model that is associated with the 2D element 906. In some embodiments, the processing unit 130 may include a 3D model extractor configured to obtain the model—e.g., retrieve the model from a non-transitory medium, and/or to generate the 3D model based on 3D model parameters. Also, in some embodiments, the 3D model extractor may be implemented as a part of the graphic generator 430. In other embodiments, the 3D model extractor may be implemented as a separate component that is separate from the graphic generator 430. For example, in such cases, the 3D model extractor may be coupled between the user input interface 410 and the graphic generator 430. During use, based on input from the user input interface, the 3D model extractor obtains the 3D model, and passes it to the graphic generator 430 for generating graphics based on the 3D model. The 3D model extractor may also be coupled to the communication device 420 so that it can receive information (e.g., 3D model, 3D model parameters, etc.) from an external device via the communication device 420.

Figure 9C:
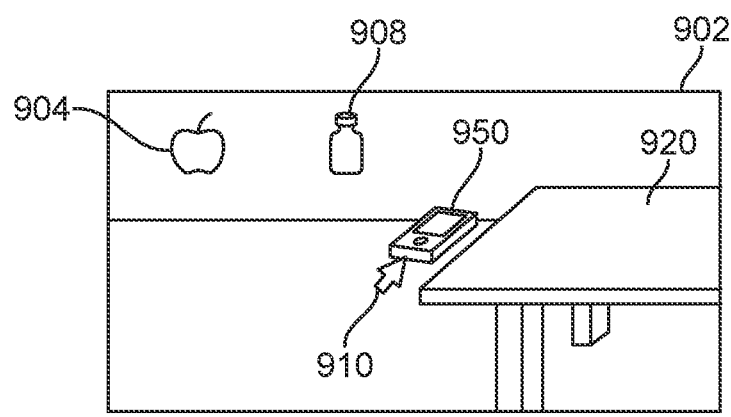
FIG. 9C illustrates an example of a 3D model or its representation being presented by the screen of the image display system.

In some embodiments, the processing unit 130 is configured to provide graphics (e.g., a displayed object) based on the accessed 3D model for display by the screen 902. For example, as shown in FIG. 9C, the graphics may be an object 950 that is rendered based on the 3D model. In some embodiments, the object 950 may be a 3D version of the 2D object 906 selected by the user. In some embodiments, the object 950 may be generated by the processing unit 130 based on the 3D model. Also, in some embodiments, the object 950 generated based on the 3D model may be the 3D model itself.

Figure 9D:
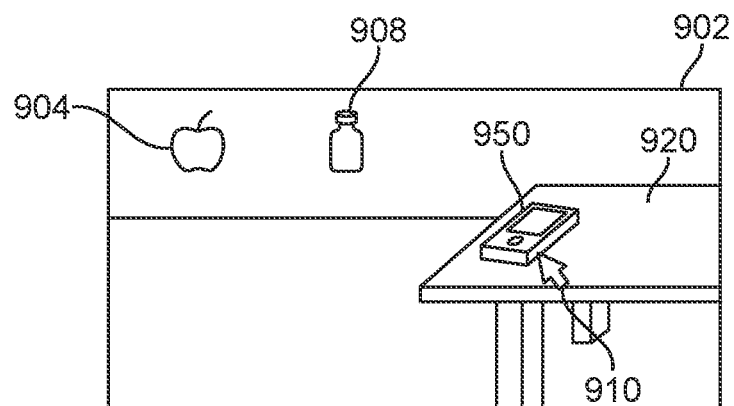
FIG. 9D illustrates an example of the 3D model of FIG. 9C or its representation being moved by a user to a desired position with respect to an environment as viewed through the screen of the image display system.

Also, in some embodiments, after the 3D model is obtained, the user may position the object 950 (e.g., in one or more directions) and/or rotate the object 950 (e.g., about one or more axes) based on the 3D model. For example, as shown in FIGS. 9C-9D, the user may use the cursor 910 to select the object 950 and move the object 950 to a certain location with respect to the environment as viewed through the screen 902. The user may also operate the user input device to define an axis of rotation to rotate the object 950. In response to a signal (received from the user input device) that prescribes rotation of the object 950, the graphic generator renders the object 950 based on the 3D model so that the orientation of the object 950 is changed. In the illustrate example, the object 950 is positioned with respect to a real object 920 (the table in the example) as viewed through the screen 902, so that the object 950 appears to be placed on top of the object 920. In other embodiments, the object 520 may be virtually placed behind a real object. Also, in other embodiments, the object 520 may be placed in front of another virtual object, or behind another virtual object. In some embodiments, the user may operate the user input device to select whether to place an object behind or in front of another object (which may be a virtual object or a real object).

In some embodiments, the processing unit 130 may be configured to perform one or more of the following operations, in any suitable order and/or performed serially or in parallel: receiving a command (e.g., long hold) that identifies a (e.g., 2D) element presented by an application (e.g., browser) executing on the computing system, the command requesting access to a (e.g., 3D) model associated with the element; responsive to the command, providing the model for addition to an environment that is presented by the computing system; and receiving one or more additional commands to place the model in a position within the environment (e.g., on or near a real-world or virtual object in the environment).

Figure 9E:
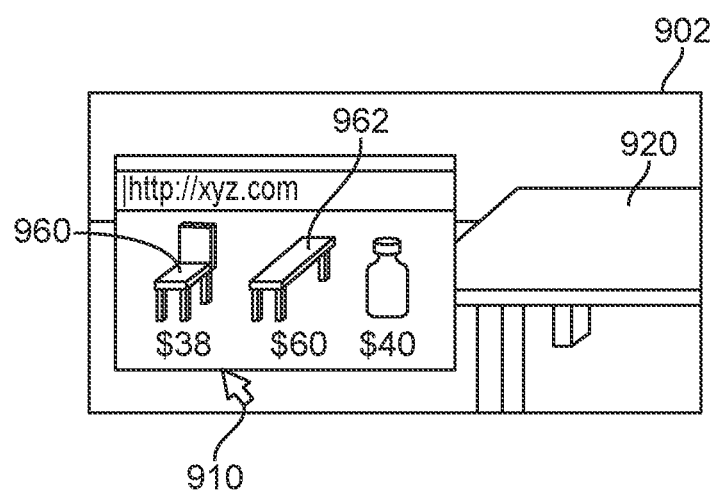
FIG. 9E illustrates other examples of 2D elements.

In the above example, the 2D elements 904, 906, 908 are presented as graphical objects in the screen 902 for selection by the user. In other embodiments, the 2D element may be any feature presented in a page, such as a webpage. FIG. 9E illustrates an example of a page that includes 2D elements 960, 962. In the illustrated example, the page is a web page, and the 2D elements 960, 962 are content presented in the web page. The 2D elements 960, 962 are associated with respective 3D models, such that a user can retrieve such models by selecting the corresponding 2D elements 960, 962. When one of the 2D elements 960, 962 is selected by the user, the processing unit 130 obtains the corresponding 3D model, and provides graphics based on the 3D model. In some embodiments, the graphics may be a 3D version of the selected 2D element for display by the screen 902. For example, the graphics may be an object rendered based on the 3D model. The processing unit 130 may also receive input from the user indicating a desired position to place the object (the 3D version of the selected 2D element). The desired position may indicate a location with respect to a coordinate system of the screen 902, and/or whether to place the object in front of, or behind, another object (e.g., a virtual object or a real object) as presented through the screen 902. The graphic generator 430 of the processing unit 130 then generates the corresponding graphics to indicate the movement and placement of the object. For example, if the object (3D version of the 2D element) is prescribed by the user to be placed virtually "behind" a real object, the graphic generator 430 may then configure the image of the object (e.g., removing a part of it that is blocked in the field of view by the real object) so that it appears to be behind the real object.

The processing unit 130 may also receive input from the user indicating a desired orientation of the object (generated based on the 3D model). For example, the user may operate the user input device to rotate the object relative to the environment as presented by the display device 101. The user input device generates the corresponding use input signal, which is received by the processing unit 130 via the user input interface 410. The graphic generator 430 then adjust the object, so that the object is rotated relative to the environment as presented by the display device 101.

The processing unit 130 may repeatedly update the object (generated based on the 3D model) based on location and/or orientation of the user. In particular, information regarding the location and/or orientation of the user may be received by the position input interface 460. Based on such information, and the 3D model, the graphic generator 430 may then adjust the object, so that the viewing perspective on the object appears to change in correspondence with a viewing direction of the user.

In some embodiments, a developer of a page (such as the example of the page of FIG. 9E) can specify that an element (e.g., element 960/962) is associated with an extractable model (e.g., 3D model), such that a model of the element can be retrieved by a user and placed elsewhere in the presented environment. In some embodiments, specifying that an element is associated with an extractable model includes modifying the markup language of the page to add particular metadata (e.g., a tag, field, or attribute) that designates the element as associated with an extractable model. When the page is rendered, the metadata enables extraction of the model when the user performs an action, such as when the user clicks on the element. In some embodiments, the metadata is a toggle or flag (e.g., true or false) indicating that a model is extractable from the associated element.

In some embodiments, the model is previously created and stored (e.g., on a web server) with the page descriptor information, and the model is available to be communicated to the system when the user performs the designated action to extract the model. In such examples, the metadata for the page may also indicate a location from which the model can be retrieved (e.g., path to model). In some embodiments, the model may be dynamically generated and communicated to the system when the user performs the designated action. In such instances, a dynamically generated model may be cached for at least some period of time to be readily available for download in response to subsequent requests for the model. In some examples, the model may load and/or otherwise be available when the page loads in the browser. The model may also be retrieved through a request made to an application programming interface (API). Any suitable type or number of (e.g., 2D) elements in a page may be designated as extractable as 3D models.

In some embodiments, 3D models may be implemented for HTML elements so that they are accessible for one or more HTML elements. FIGS. 10A-10B illustrate examples of implementations of one or more embodiments of 3D models that are associated with HTML elements.

Figure 11:
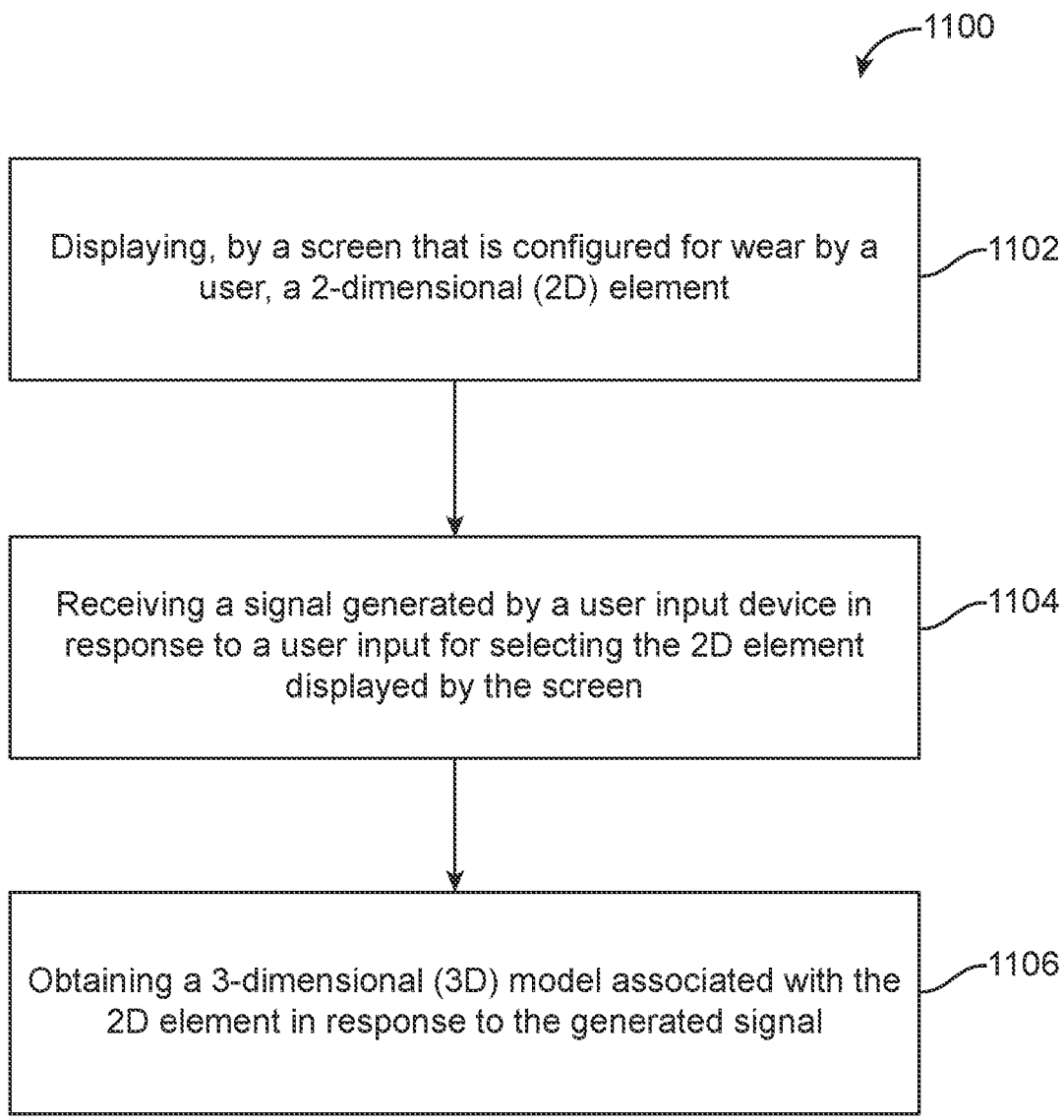
FIG. 11 illustrates a method performed by a processing unit of an image display device.

Method Performed by the Processing Unit and/or Application in the Processing Unit FIG. 11 illustrates a method 1100 in accordance with some embodiments. The method 1000 may be performed by an apparatus that is configured for head-worn by a user, the apparatus having a screen configured to present graphics for the user, and a processing unit. In some embodiments, the method 1100 may be performed by any of the image display devices 101 shown in FIGS. 1-4. For example, the method 1100 may be performed by the processing unit 130 of the image display device 101. The method 1100 includes: displaying, by a screen that is configured for wear by a user, a 2-dimensional (2D) element (item 1102); receiving a signal generated by a user input device in response to a user input for selecting the 2D element displayed by the screen (item 1104); and obtaining a 3-dimensional (3D) model associated with the 2D element in response to the generated signal (item 1106).

Optionally, in the method 1100, the signal is generated in response to a double-clicking action, a press-and-hold action, a long hold action, a pressing of a button while a cursor is pointing at the 2D element, a hovering of the cursor over the 2D element for a threshold period of time, or an audio input.

Optionally, in the method 1100, the 2D element indicates an object, and the 3D model is a three-dimensional version of the object.

Optionally, in the method 1100, the 3D model is a 3D rendering or 3D depiction of the 2D element.

Optionally, the method 1100 further includes providing an indication that the 2D element is selectable to access the 3D model.

Optionally, in the method 1100, the indication comprises a visual information.

Item 32: In the method, the visual information comprises a change in a color of the 2D element.

Optionally, in the method 1100, the visual information comprises a graphic that is displayed in association with the 2D element.

Optionally, in the method 1100, the visual information comprises a change in a configuration of a cursor.

Optionally, in the method 1100, the visual information comprises a display of the 3D model beginning to grow out of the 2D element.

Optionally, in the method 1100, the act of providing the indication comprises providing an audio signal.

Optionally, in the method 1100, the 2D element is presented within a browser or a viewer.

Optionally, in the method 1100, the 3D model is stored in association with a page descriptor information.

Optionally, in the method 1100, the 2D element is a part of a page, and wherein metadata for the page indicates a location from which the 3D model is to be retrieved.

Optionally, in the method 1100, the 2D element is part of a page, and wherein markup language of the page comprises metadata that designates the 2D element as being associated with the 3D model.

Optionally, in the method 1100, the 3D model is dynamically generated.

Optionally, in the method 1100, the 2D element is a part of a page presented in a browser or viewer, and wherein the 3D model is loaded and/or made available when or after the page is loaded in the browser or the viewer.

Optionally, in the method 1100, the act of obtaining the 3D model comprises retrieving, by a processing unit, the 3D model through a request made to an application programming interface (API).

Optionally, in the method 1100, the act of obtaining the 3D model associated with the 2D element comprises receiving the 3D model transmitted via a network.

Optionally, in the method 1100, the 3D model is stored in a memory, and wherein the act of obtaining the 3D model comprises retrieving the 3D model from the memory.

Optionally, in the method 1100, the 3D model is for addition to an environment that is presented by the system.

Optionally, the method 1100 further includes receiving a command for placing the 3D model at a certain location with respect to an environment as viewed through the screen.

Optionally, in the method 1100, the command comprises a cursor position generated based on a movement of a cursor to place the 3D model in association with a virtual object or a real-world object with respect to the environment.

Optionally, in the method 1100, the screen is at least partially transparent for allowing the user to view a surrounding environment through the screen.

Optionally, the method 1100 is performed by a system that is configured to provide a MR, AR, or VR environment to the user.

Specialized Processing System

In some embodiments, the method 1100 described herein may be performed by the processing unit 130 executing an application, or by the application. The application may contain a set of instructions. In one implementation, a specialized processing system having a non-transitory medium storing the set of instruction for the application may be provided. The execution of the instruction by the processing unit 130 of the image display device 101 will cause the processing unit 130 to perform the features described herein. For example, in some embodiments, an execution of the instructions by a processing unit 130 of a head-worn image display device will cause the method 1100 to be performed. In other embodiments, other types of image display device (e.g., a computer, a laptop, a tablet, a mobile phone, etc.) may be configured to execute the instructions to cause the method 1100 to be performed.

In some embodiments, the image display device 101 may also be considered as a specialized processing system. In particular, the image display device 101 is a specialized processing system in that it contains instruction stored in its non-transitory medium for execution by the processing unit 130 to provide unique tangible effects in a real world. The features provided by the image display device 101 (as a result of the processing unit 130 executing the instruction) provide improvements for MR, VR, and AR devices, because they enhance the users' experiences in using these types of devices.

Figure 12:
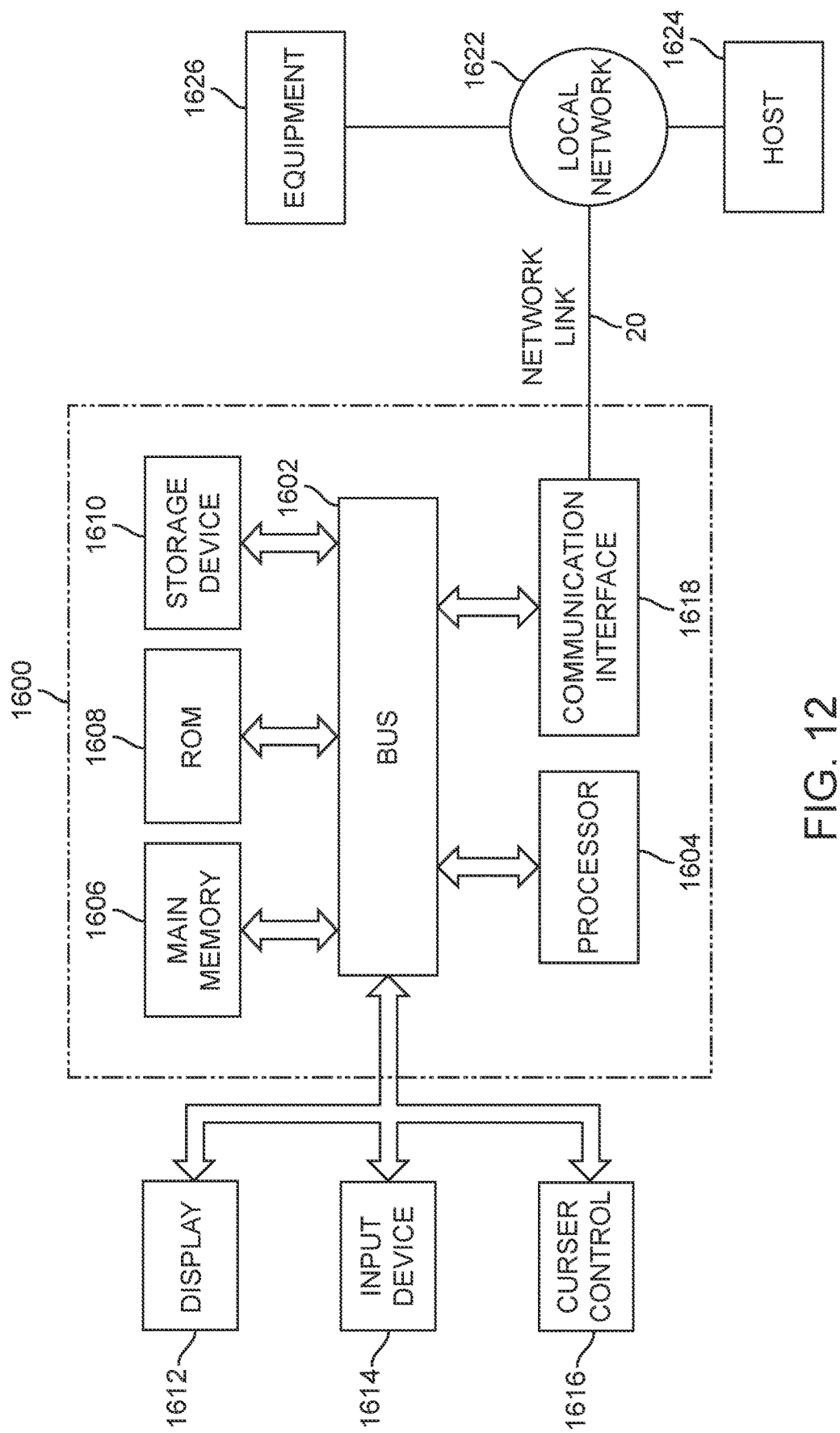
FIG. 12 illustrates a specialized processing system in accordance with some embodiments.

FIG. 12 is a block diagram illustrating an embodiment of a specialized processing system 1600 that can be used to implement various features described herein. For example, in some embodiments, the processing system 1600 may be used to implement the image display device 101. Also, in some embodiments, the processing system 1600 may be used to implement the processing unit 130, or one or more components therein (e.g., the user input interface 410, the communication device 420, the graphic generator 430, the non-transitory medium 450, the position input interface 460, etc.).

The processing system 1600 includes a bus 1602 or other communication mechanism for communicating information, and a processor 1604 coupled with the bus 1602 for processing information. The processor system 1600 also includes a main memory 1606, such as a random access memory (RAM) or other dynamic storage device, coupled to the bus 1602 for storing information and instructions to be executed by the processor 1604. The main memory 1606 also may be used for storing temporary variables or other intermediate information during execution of instructions to be executed by the processor 1604. The processor system 1600 further includes a read only memory (ROM) 1608 or other static storage device coupled to the bus 1602 for storing static information and instructions for the processor 1604. A data storage device 1610, such as a magnetic disk, solid state disk, or optical disk, is provided and coupled to the bus 1602 for storing information and instructions.

The processor system 1600 may be coupled via the bus 1602 to a display 1612, such as a screen, for displaying information to a user. In some cases, if the processing system 1600 is part of the apparatus that includes a touch-screen, the display 1612 may be the touch-screen. An input device 1614, including alphanumeric and other keys, is coupled to the bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane. In some cases, if the processing system 1600 is part of the apparatus that includes a touch-screen, the input device 1614 and the curser control may be the touch-screen.

In some embodiments, the processor system 1600 can be used to perform various functions described herein. According to some embodiments, such use is provided by processor system 1600 in response to processor 1604 executing one or more sequences of one or more instructions contained in the main memory 1606. Those skilled in the art will know how to prepare such instructions based on the functions and methods described herein. Such instructions may be read into the main memory 1606 from another processor-readable medium, such as storage device 1610. Execution of the sequences of instructions contained in the main memory 1606 causes the processor 1604 to perform the process steps described herein. One or more processors in a multi-processing arrangement may also be employed to execute the sequences of instructions contained in the main memory 1606. In alternative embodiments, hard-wired circuitry may be used in place of or in combination with software instructions to implement the various embodiments described herein. Thus, embodiments are not limited to any specific combination of hardware circuitry and software.

The term "processor-readable medium" as used herein refers to any medium that participates in providing instructions to the processor 1604 for execution. Such a medium may take many forms, including but not limited to, non-volatile media, volatile media, and transmission media. Non-volatile media includes, for example, optical, solid state or magnetic disks, such as the storage device 1610. A non-volatile medium may be considered an example of non-transitory medium. Volatile media includes dynamic memory, such as the main memory 1606. A volatile medium may be considered an example of non-transitory medium. Transmission media includes coaxial cables, copper wire and fiber optics, including the wires that comprise the bus 1602. Transmission media can also take the form of acoustic or light waves, such as those generated during radio wave and infrared data communications.

Common forms of processor-readable media include, for example, a flexible disk, hard disk, magnetic tape, or any other magnetic medium, a CD-ROM, any other optical medium, any other physical medium with patterns of holes, a RAM, a PROM, and EPROM, a FLASH-EPROM, solid state disks any other memory chip or cartridge, a carrier wave as described hereinafter, or any other medium from which a processor can read.

Various forms of processor-readable media may be involved in carrying one or more sequences of one or more instructions to the processor 1604 for execution. For example, the instructions may initially be carried on a magnetic disk or solid state disk of a remote computer. The remote computer can load the instructions into its dynamic memory and send the instructions over a network, such as the Internet. The processing system 1600 can receive the data on a network line. The bus 1602 carries the data to the main memory 1606, from which the processor 1604 retrieves and executes the instructions. The instructions received by the main memory 1606 may optionally be stored on the storage device 1610 either before or after execution by the processor 1604.

The processing system 1600 also includes a communication interface 1618 coupled to the bus 1602. The communication interface 1618 provides a two-way data communication coupling to a network link 1620 that is connected to a local network 1622. For example, the communication interface 1618 may be a local area network (LAN) card to provide a data communication connection to a compatible LAN. Wireless links may also be implemented. In any such implementation, the communication interface 1618 sends and receives electrical, electromagnetic or optical signals that carry data streams representing various types of information.

The network link 1620 typically provides data communication through one or more networks to other devices. For example, the network link 1620 may provide a connection through local network 1622 to a host computer 1624 or to equipment 1626. The data streams transported over the network link 1620 can comprise electrical, electromagnetic or optical signals. The signals through the various networks and the signals on the network link 1620 and through the communication interface 1618, which carry data to and from the processing system 1600, are exemplary forms of carrier waves transporting the information. The processing system 1600 can send messages and receive data, including program code, through the network(s), the network link 1620, and the communication interface 1618.

It should be noted that the term "image", as used in this specification, may refer to image that is displayed, and/or image that is not in displayed form (e.g., image that is stored in a medium, or that is being processed).

Exemplary aspects of the disclosure, together with details regarding material selection and manufacture have been set forth above. As for other details of the present disclosure, these may be appreciated in connection with the abovereferenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. It is further noted that any claim may be drafted to exclude any optional element. As such, this statement is intended to serve as antecedent basis for use of such exclusive terminology as "solely," "only" and the like in connection with the recitation of claim elements, or use of a "negative" limitation.

In addition, as used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

The breadth of the present disclosure is not to be limited to the examples provided and/or the subject specification, but rather only by the scope of claim language associated with this disclosure.

The following items are exemplary features of one or more embodiments described herein:

A system includes: a screen configured for wear by a user, the screen configured to display a 2-dimensional (2D) element; a processing unit coupled to the display; and a user input device configured to generate a signal in response to a user input for selecting the 2D element displayed by the screen; wherein the processing unit is configured to obtain a 3-dimensional (3D) model associated with the 2D element in response to the generated signal.

Item 2: In the system, the user input device is configured to generate the signal in response to a double-clicking action, a press-and-hold action, a long hold action, a pressing of a button while a cursor is pointing at the 2D element, a hovering of the cursor over the 2D element for a threshold period of time, or an audio input.

Item 3: In the system, the 2D element indicates an object, and the 3D model is a three-dimensional version of the object.

Item 4: In the system, the 3D model is a 3D rendering or 3D depiction of the 2D element.

Item 5: The system is configured to provide an indication that the 2D element is selectable to access the 3D model.

Item 6: In the system, the screen is configured to provide a visual information as the indication.

Item 7: In the system, the visual information comprises a change in a color of the 2D element.

Item 8: In the system, the visual information comprises a graphic that is displayed in association with the 2D element.

Item 9: In the system, the visual information comprises a change in a configuration of a cursor.

Item 10: In the system, the visual information comprises a display of the 3D model beginning to grow out of the 2D element.

Item 11: The system is configured to provide an audio signal as the indication.

Item 12: In the system, the 2D element is presented within a browser or a viewer.

Item 13: In the system, the 3D model is stored in association with a page descriptor information.

Item 14: In the system, the 2D element is a part of a page, and wherein metadata for the page indicates a location from which the 3D model is to be retrieved.

Item 15: In the system, the 2D element is part of a page, and wherein markup language of the page comprises metadata that designates the 2D element as being associated with the 3D model.

Item 16: In the system, the 3D model is dynamically generated.

Item 17: In the system, the 2D element is a part of a page presented in a browser or viewer, and wherein the 3D model is loaded and/or made available when or after the page is loaded in the browser or the viewer.

Item 18: In the system, the processing unit is configured to retrieve the 3D model through a request made to an application programming interface (API).

Item 19: In the system, the processing unit is configured to obtain the 3D model associated with the 2D element by receiving the 3D model transmitted via a network.

Item 20: The system further includes a memory storing the 3D model, and wherein the processing unit is configured to obtain the 3D model by retrieving the 3D model from the memory.

Item 21: In the system, the 3D model is for addition to an environment that is presented by the system.

Item 22: In the system, the processing unit is configured to receive a command for placing the 3D model at a certain location with respect to an environment as viewed through the screen.

Item 23: In the system, the command comprises a cursor position generated based on a movement of a cursor to place the 3D model in association with a virtual object or a real-world object with respect to the environment.

Item 24: In the system, the screen is at least partially transparent for allowing the user to view a surrounding environment through the screen.

Item 25: The system is configured to provide a MR, AR, or VR environment to the user.

Item 26: A method includes: displaying, by a screen that is configured for wear by a user, a 2-dimensional (2D) element; receiving a signal generated by a user input device in response to a user input for selecting the 2D element displayed by the screen; and obtaining a 3-dimensional (3D) model associated with the 2D element in response to the generated signal.

Item 27: In the method, the signal is generated in response to a double-clicking action, a press-and-hold action, a long hold action, a pressing of a button while a cursor is pointing at the 2D element, a hovering of the cursor over the 2D element for a threshold period of time, or an audio input.

Item 28: In the method, the 2D element indicates an object, and the 3D model is a three-dimensional version of the object.

Item 29: In the method, the 3D model is a 3D rendering or 3D depiction of the 2D element.

Item 30: The method further includes providing an indication that the 2D element is selectable to access the 3D model.

Item 31: In the method, the indication comprises a visual information.

Item 32: In the method, the visual information comprises a change in a color of the 2D element.

Item 33: In the method, the visual information comprises a graphic that is displayed in association with the 2D element.

Item 34: In the method, the visual information comprises a change in a configuration of a cursor.

Item 35: In the method, the visual information comprises a display of the 3D model beginning to grow out of the 2D element.

Item 36: In the method, the act of providing the indication comprises providing an audio signal.

Item 37: In the method, the 2D element is presented within a browser or a viewer.

Item 38: In the method, the 3D model is stored in association with a page descriptor information.

Item 39: In the method, the 2D element is a part of a page, and wherein metadata for the page indicates a location from which the 3D model is to be retrieved.

Item 40: In the method, the 2D element is part of a page, and wherein markup language of the page comprises metadata that designates the 2D element as being associated with the 3D model.

Item 41: In the method, the 3D model is dynamically generated.

Item 42: In the method, the 2D element is a part of a page presented in a browser or viewer, and wherein the 3D model is loaded and/or made available when or after the page is loaded in the browser or the viewer.

Item 43: In the method, the act of obtaining the 3D model comprises retrieving, by a processing unit, the 3D model through a request made to an application programming interface (API).

Item 44: In the method, the act of obtaining the 3D model associated with the 2D element comprises receiving the 3D model transmitted via a network.

Item 45: In the method, the 3D model is stored in a memory, and wherein the act of obtaining the 3D model comprises retrieving the 3D model from the memory.

Item 46: In the method, the 3D model is for addition to an environment that is presented by the system.

Item 47: The method further includes receiving a command for placing the 3D model at a certain location with respect to an environment as viewed through the screen.

Item 48: In the method, the command comprises a cursor position generated based on a movement of a cursor to place the 3D model in association with a virtual object or a real-world object with respect to the environment.

Item 49: In the method, the screen is at least partially transparent for allowing the user to view a surrounding environment through the screen.

Item 50: The method is performed by a system that is configured to provide a MR, AR, or VR environment to the user.

Item 51: A product includes a non-transitory medium storing a set of instructions, an execution of which by a processing unit will cause a method to be performed, the method comprising: displaying, by a screen that is configured for wear by a user, a 2-dimensional (2D) element; receiving a signal generated by a user input device in response to a user input for selecting the 2D element displayed by the screen; and obtaining a 3-dimensional (3D) model associated with the 2D element in response to the generated signal.

In the foregoing specification, the disclosure has been described with reference to specific embodiments thereof. It will, however, be evident that various modifications and changes may be made thereto without departing from the scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

The invention claimed is:

1. A system, comprising:
a screen configured for wear by a user, the screen configured to display a 2-dimensional (2D) element;
a processing unit coupled to the display; and
a user input device configured to generate a signal in response to a user input moving a cursor to a position associated with the 2D element displayed by the screen;
wherein the processing unit is configured to obtain model information of a 3-dimensional (3D) model associated with the 2D element from a storage device;
wherein the 2D element comprises a graphical object, and the 3D model is a three-dimensional version of the graphical object;
wherein the system is configured to provide an indication in response to the signal generated by the user input device, the indication informing the user that the 3D model associated with the 2D element is available for access, wherein the system is configured to provide the indication before the 3D model is provided for manipulation by the user; and
wherein the indication comprises a changing graphic displayed in association with the 2D element, the changing graphic indicating that the 3D model is accessible, and wherein the system is configured to provide the changing graphics after the signal is generated.

2. The system of claim 1, wherein the user input device is configured to generate the signal in response to a double-clicking action, a press-and-hold action, a long hold action, a pressing of a button while a cursor is pointing at the 2D element, a hovering of the cursor over the 2D element for a threshold period of time, or an audio input.

3. The system of claim 1, wherein the 3D model is a 3D rendering or 3D depiction of the 2D element.

4. The system of claim 1, wherein the changing graphic comprises a change in a color of the 2D element.

5. The system of claim 1, wherein the changing graphic is displayed next to the 2D element.

6. The system of claim 1, wherein the changing graphic comprises a change in a configuration of the cursor.

7. The system of claim 1, wherein the changing graphic comprises a display of the 3D model beginning to grow out of the 2D element.

8. The system of claim 1, wherein the 2D element is presented within a browser or a viewer.

9. The system of claim 1, wherein the 3D model is stored in association with a page descriptor information.

10. The system of claim 1, wherein the 2D element is a part of a page, and wherein metadata for the page indicates a location from which the 3D model is to be retrieved.

11. The system of claim 1, wherein the 2D element is part of a page, and wherein markup language of the page comprises metadata that designates the 2D element as being associated with the 3D model.

12. The system of claim 1, wherein the 3D model is dynamically generated.

13. The system of claim 1, wherein the 2D element is a part of a page presented in a browser or viewer, and wherein the 3D model is loaded and/or made available when or after the page is loaded in the browser or the viewer.

14. The system of claim 1, wherein the processing unit is configured to retrieve the 3D model through a request made to an application programming interface (API).

15. The system of claim 1, wherein the processing unit is configured to obtain the 3D model associated with the 2D element by receiving the 3D model transmitted via a network.

16. The system of claim 1, further comprising a memory storing the 3D model, and wherein the processing unit is configured to obtain the 3D model by retrieving the 3D model from the memory.

17. The system of claim 1, wherein the 3D model is for addition to an environment that is presented by the system.

18. The system of claim 1, wherein the processing unit is configured to receive a command for placing the 3D model at a certain location with respect to an environment as viewed through the screen.

19. The system of claim 18, wherein the command comprises a cursor position generated based on a movement of the cursor to place the 3D model in association with a virtual object or a real-world object with respect to the environment.

20. The system of claim 1, wherein the screen is at least partially transparent for allowing the user to view a surrounding environment through the screen.

21. The system of claim 1, wherein the system is configured to provide a MR, AR, or VR environment to the user.

22. The system of claim 1, wherein the changing graphic is different from the 2D element.

23. A method, comprising:
   displaying, by a screen that is configured for wear by a user, a 2-dimensional (2D) element;
   receiving a signal generated by a user input device in response to a user input moving a cursor to a position associated with the 2D element displayed by the screen; and
   obtaining model information of a 3-dimensional (3D) model associated with the 2D element from a storage device;
   wherein the 2D element comprises a graphical object, and the 3D model is a three-dimensional version of the graphical object;
   wherein the method further comprises providing an indication in response to the signal generated by the user input device, the indication informing the user that the 3D model associated with the 2D element is available for access, wherein the indication is provided before the 3D model is provided for manipulation by the user; and
   wherein the indication comprises a changing graphic displayed in association with the 2D element, the changing graphic indicating that the 3D model is accessible, and wherein the changing graphics is provided after the signal is generated.

24. A product comprising a non-transitory medium storing a set of instructions, an execution of which by a processing unit will cause a method to be performed, the method comprising:
   displaying, by a screen that is configured for wear by a user, a 2-dimensional (2D) element;
   receiving a signal generated by a user input device in response to a user input moving a cursor to a position associated with the 2D element displayed by the screen; and
   obtaining model information of a 3-dimensional (3D) model associated with the 2D element from a storage device;
   wherein the 2D element comprises a graphical object, and the 3D model is a three-dimensional version of the graphical object;
   wherein the method further comprises providing an indication in response to the signal generated by the user input device, the indication that the 3D model associated with the 2D element is available for access, wherein the indication is provided before the 3D model is provided for manipulation by the user; and
   wherein the indication comprises a changing graphic displayed in association with the 2D element, the changing graphics indicating that the 3D model is accessible, and wherein the changing graphic is provided after the signal is generated.

* * * * *